(12) United States Patent
Lu et al.

(10) Patent No.: US 9,785,585 B2
(45) Date of Patent: Oct. 10, 2017

(54) METHOD FOR CARD READER TO COMMUNICATE WITH UPPER COMPUTER VIA USB CHANNEL COMMUNICATION AND BLUETOOTH CHANNEL CONNECTION

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 265 days.

(21) Appl. No.: 14/650,878

(22) PCT Filed: Jan. 14, 2014

(86) PCT No.: PCT/CN2014/070599
§ 371 (c)(1),
(2) Date: Jun. 10, 2015

(87) PCT Pub. No.: WO2014/121681
PCT Pub. Date: Aug. 14, 2014

(65) Prior Publication Data
US 2015/0347329 A1    Dec. 3, 2015

(30) Foreign Application Priority Data

Feb. 7, 2013    (CN) .......................... 2013 1 0049893

(51) Int. Cl.
*G06F 13/00*    (2006.01)
*G06F 13/24*    (2006.01)
(Continued)

(52) U.S. Cl.
CPC ............ *G06F 13/24* (2013.01); *G06F 13/382* (2013.01); *G06F 13/4081* (2013.01);
(Continued)

(58) Field of Classification Search
CPC ............................ G06F 13/24; H04L 63/0853
See application file for complete search history.

(56) References Cited

U.S. PATENT DOCUMENTS 9,589,160 B2 * 3/2017 Lu ...................... H04L 63/0853
2007/0180174 A1 * 8/2007 Moosavi ............... G06F 13/426
710/106
(Continued)

OTHER PUBLICATIONS

Micro/Sys—"White Paper: Interrupts and USB"; 1 page No Date Provided.*

*Primary Examiner* — Tammara Peyton
(74) *Attorney, Agent, or Firm* — Hammer & Associates, P.C.

(57) ABSTRACT

A method for a card reader to communicate with an upper computer comprises: initializing a card reader system and enabling an interrupt; determining an interrupt identification type; for Bluetooth communication interrupt identification resetting or USB communication interrupt identification resetting, receiving an instruction and saving a channel identification corresponding to the instruction, performing a corresponding operation according to an instruction type, sending a corresponding response to the upper computer and clearing the Bluetooth communication interrupt identification or the USB communication interrupt identification; for another interrupt identification, performing a corresponding operation according to an interrupt identification type. The method can solve a problem in prior art that a card reader cannot communicate with mobile devices of different models through a USB port.

23 Claims, 10 Drawing Sheets

(51) Int. Cl.
*H04W 4/00* (2009.01)
*G06F 13/40* (2006.01)
*G06F 13/42* (2006.01)
*G06F 13/38* (2006.01)
*H04L 29/06* (2006.01)

(52) U.S. Cl.
CPC ........ G06F 13/4282 (2013.01); H04W 4/008 (2013.01); H04L 63/0853 (2013.01)

(56) References Cited

U.S. PATENT DOCUMENTS

2008/0307140 A1  12/2008  Goldstein et al.
2011/0197007 A1* 8/2011  Lu .................. G06F 13/102
                                          710/301
2015/0161418 A1* 6/2015  Ishikawa ........... G06K 13/06
                                          235/449

* cited by examiner

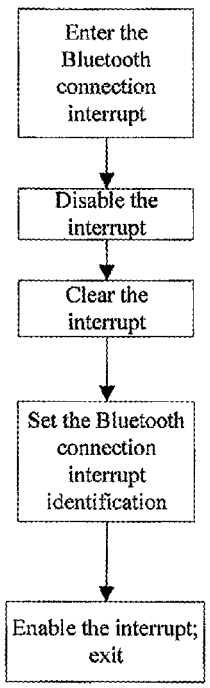
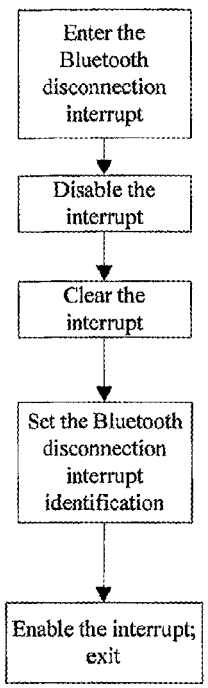
Fig. 2-6          Fig. 2-7
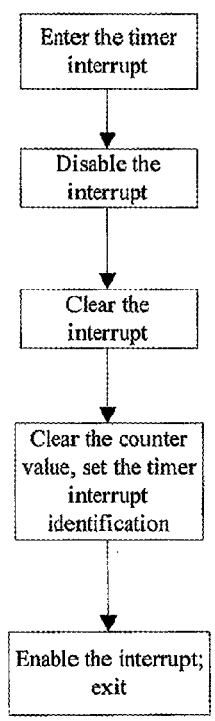
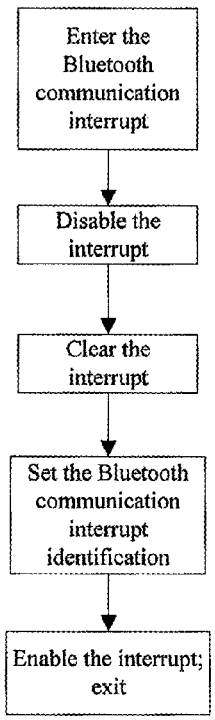
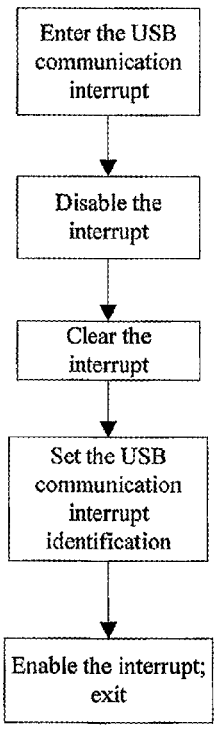
Fig. 2-8          Fig. 2-9          Fig. 2-10

METHOD FOR CARD READER TO COMMUNICATE WITH UPPER COMPUTER VIA USB CHANNEL COMMUNICATION AND BLUETOOTH CHANNEL CONNECTION

FIELD OF THE INVENTION

The method relates to communication field, more particularly to a method for a card reader to communicate with an upper computer, i.e. a method for communicating between a card reader and an upper computer.

PRIOR ART

With development of science and technology, a mobile device is used more and more widely. Due to special characters of the mobile devices, the hardware interfaces of mobile devices from different manufactures are different. At present, without uniform of USB interface, the USB interface cannot be used to communicate with different types of mobile devices.

SUMMARY OF THE INVENTION

The object of the present invention is to provide a method for a card reader to communicate with an upper computer, which can realize communication with different types of mobile devices via USB interface.

Therefore, the present invention provides a method for a card reader to communicate with an upper computer, which comprises:

Step A, initializing a card reader system, enabling card insert interrupt, card pull-out interrupt, USB insert interrupt, USB pull-out interrupt, Bluetooth connection interrupt, Bluetooth disconnection interrupt, USB communication interrupt, and/or Bluetooth communication interrupt;

Step B, determining whether work voltage is lower than a preset value, if the work voltage is lower than the preset value, prompting low work voltage state, if the low work voltage state overpasses a first preset time, close the card reader; if the work voltage is not lower than the preset value, going back to Step B;

the above procedure further comprising:

when the card reader receiving a USB communication interrupt signal, entering the USB communication interrupt, receiving an instruction through USB channel, performing corresponding operation upon the received instruction and returning operation result to the upper computer through the USB channel;

when the card reader receiving a Bluetooth communication interrupt signal, entering the Bluetooth communication interrupt, receiving an instruction through Bluetooth channel and performing corresponding operation upon the received instruction and returning operation result to the upper computer through the Bluetooth channel;

when the card reader receiving a USB insert interrupt signal, entering the USB insert interrupt, setting a USB channel connection identification;

when the card reader receiving a USB pull-out interrupt signal, entering the USB pull-out interrupt, resetting the USB channel connection identification;

when the card reader receiving a Bluetooth connection interrupt signal, entering the Bluetooth connection interrupt, setting a Bluetooth channel connection interrupt identification;

when the card reader receiving a Bluetooth disconnection interrupt signal, entering the Bluetooth disconnection interrupt, resetting the Bluetooth channel connection identification;

when the card reader receiving a card insert interrupt signal, entering the card insert interrupt, setting a card slot state identification as with-card identification; and/or when the card reader receiving a card pull-out interrupt signal, entering card pull-out interrupt, setting the card slot state identification as without-card identification.

Preferably, between Step A and Step B, the method further comprises:

Step B1, reading parameters of a Bluetooth module, determining whether the reading is successful, if yes, switching the Bluetooth module into connection state and performing Step B; if no, setting a USB channel identification and performing Step B; or Step B2, reading parameters of the Bluetooth module, determining whether the reading is successful, if yes, switching the Bluetooth module into connection state and performing Step B; if no, going back to Step B2.

Preferably, the entering USB insert interrupt, setting a USB channel connection identification, specifically comprises:

entering the USB insert interrupt, determining whether a sleep identification is set, if yes, resetting the sleep identification, waking up the MCU, enabling USB channel, setting the USB channel connection identification, exiting the USB insert interrupt; if no, enabling the USB channel, setting the USB channel connection identification, exiting the USB insert interrupt;

entering the USB pull-out interrupt, resetting the USB channel connection identification specifically comprises:

entering the USB pull-out interrupt, determining whether the Bluetooth channel connection identification is set, if yes, disabling the USB channel, resetting the USB channel connection identification, exiting the USB pull-out interrupt; if no, disabling the USB channel, resetting the USB channel connection identification, setting the sleep identification and the MCU sleeping, exiting the USB pull-out interrupt;

the entering the Bluetooth connection interrupt, setting a Bluetooth channel connection interrupt identification specifically comprises:

entering the Bluetooth connection interrupt, determining whether the sleep identification is set, if yes, resetting the sleep identification, waking up the MCU, enabling Bluetooth channel, setting the Bluetooth channel connection identification, exiting the Bluetooth connection interrupt;

the entering Bluetooth disconnection interrupt, resetting the Bluetooth channel connection identification specifically comprises:

entering the Bluetooth disconnection interrupt, determining whether the USB channel connection identification is set, if yes, disabling the Bluetooth channel, resetting the Bluetooth channel connection identification, exiting the Bluetooth disconnection interrupt; if no, disabling the Bluetooth channel, resetting the Bluetooth channel connection identification, setting the sleep identification, the MCU sleeping, existing the Bluetooth disconnection interrupt.

Preferably, when the determination in Step B is no, before going back to Step B, the method further comprises, Step C: detecting connection way between the card reader and the upper computer;

setting, by the card reader, the USB channel connection identification and going back to Step B if the card reader connects to the up computer through USB interface; setting the Bluetooth channel connection identification and going back to Step B if the card reader connects to the upper computer through the Bluetooth module;

the entering the USB insert interrupt, setting the USB channel connection identification specifically comprises:

entering USB insert interrupt, determining whether the sleep identification is set, if the sleep identification is set, resetting the sleep identification, waking up the MCU, enabling USB channel, setting the USB channel connection identification, disabling Bluetooth connection interrupt, determining whether the Bluetooth channel connection identification is set, if the Bluetooth channel connection identification is set, resetting the Bluetooth channel connection identification and exiting the USB insert interrupt; if the Bluetooth channel connection identification is not set, exiting the USB insert interrupt;

if the sleep identification is not set, determining whether the Bluetooth channel connection identification is set, if yes, resetting the Bluetooth channel connection identification, disabling the Bluetooth connection interrupt, enabling the USB channel, setting the USB channel connection identification, exiting the USB insert interrupt; if no, disabling the Bluetooth connection, enabling the USB channel, resetting the USB channel connection identification, exiting the USB insert interrupt;

the entering the USB pull-out interrupt, resetting the USB channel connection identification specifically:

entering the USB disconnection interrupt, disabling the USB channel, resetting the USB channel connection identification, enabling the Bluetooth connection interrupt, setting the sleep identification, the MCU sleeping, exiting the USB pull-out interrupt;

the entering the Bluetooth connection interrupt, setting the Bluetooth channel connection identification specifically comprises:

entering the Bluetooth connection interrupt, determining whether the sleep identification is set, if yes, resetting the sleep identification, waking up the MCU, enabling the Bluetooth channel, setting the Bluetooth channel connection interrupt, exiting the Bluetooth connection interrupt; if no, enabling the Bluetooth channel, setting the Bluetooth channel connection identification and exiting the Bluetooth connection interrupt;

the entering the Bluetooth disconnection interrupt, resetting the Bluetooth channel connection identification specifically comprises:

entering the Bluetooth disconnection interrupt, disabling the Bluetooth channel, resetting the Bluetooth channel connection identification, setting the sleep identification, the MCU sleeping, exiting the Bluetooth disconnection interrupt.

Preferably, when the determination in Step B is no, before going back to Step B, the method further comprises, Step C': detecting connection way between the card reader and the upper computer;

setting, by the card reader, the Bluetooth connection identification and going back to Step B if the card reader is connected to the upper computer through the Bluetooth module; setting the USB channel connection identification and going back to Step B if the card reader is connected to the upper computer through the USB interface;

the entering USB insert interrupt, setting the USB channel connection identification specifically comprises:

entering the USB insert interrupt, determining whether the sleep identification is set, if yes, resetting the sleep identification, waking up the MCU, enabling the USB channel, setting the USB channel connection identification and exiting the USB insert interrupt; if no, enabling the USB channel, setting the USB channel connection identification and exiting the USB insert interrupt;

the entering the USB pull-out interrupt and resetting the USB channel connection identification, specifically comprises:

entering the USB pull-out interrupt, disabling the USB channel, resetting the USB channel connection identification, setting the sleep identification, the MCU sleeping, exiting the USB pull-out interrupt;

the entering the Bluetooth connection interrupt, setting the Bluetooth channel connection identification specifically comprises:

entering the Bluetooth connection interrupt, determining whether the sleep identification is set, if yes, setting the sleep identification, waking up the MCU, enabling the Bluetooth channel, setting the Bluetooth channel connection identification, disabling the USB insert interrupt, exiting the Bluetooth connection interrupt; if no, determining whether the USB channel connection identification is set, if the USB channel connection identification is set, resetting the USB channel connection identification, enabling the Bluetooth channel, setting the Bluetooth channel connection identification, disabling the USB insert interrupt, exiting the Bluetooth connection interrupt; if the USB channel connection identification is not set, enabling the Bluetooth channel, setting the Bluetooth channel connection identification, disabling the USB insert interrupt, exiting the Bluetooth connection interrupt;

the entering the Bluetooth disconnection interrupt and resetting the Bluetooth channel connection identification, specifically comprises:

entering the Bluetooth disconnection interrupt, disabling the Bluetooth channel, resetting the Bluetooth channel connection identification, enabling the USB insert interrupt, setting the sleep identification, the MCU sleeping, exiting the Bluetooth disconnection interrupt.

Preferably, the entering the USB insert interrupt and setting the USB channel connection identification, specifically comprises:

entering the USB insert interrupt, determining whether the sleep identification is set, if the sleep identification is set, resetting the sleep identification, waking up the MCU, enabling the USB channel, setting the USB channel connection identification, disabling the Bluetooth connection interrupt, exiting the USB insert interrupt; if the sleep identification is not set, enabling the USB channel, setting the USB channel connection identification, disabling the Bluetooth connection interrupt, exiting the USB insert interrupt;

the entering the USB pull-out interrupt and resetting the USB channel connection identification, specifically comprises:

entering the USB pull-out interrupt, disabling the USB channel, resetting the USB channel connection identification, enabling the Bluetooth connection interrupt, setting the sleep identification, the MCU sleeping, exiting the USB pull-out interrupt;

the entering the Bluetooth connection interrupt and setting the Bluetooth channel connection identification, specifically comprises:

entering the Bluetooth connection interrupt, determining whether the sleep identification is set, if yes, resetting the sleep identification, waking up the MCU, enabling the Bluetooth channel, setting the Bluetooth channel connection identification, disabling the USB insert interrupt, exiting the Bluetooth connection interrupt; if no, enabling the Bluetooth channel, setting the Bluetooth channel connection identification, disabling the USB insert interrupt, exiting the Bluetooth connection interrupt;

the entering the Bluetooth disconnection interrupt and resetting the Bluetooth channel connection identification, specifically comprises:

entering the Bluetooth disconnection interrupt, disabling the Bluetooth channel, resetting the Bluetooth channel connection identification, enabling the USB insert interrupt, setting the sleep identification, the MCU sleeping, exiting the Bluetooth disconnection interrupt.

Preferably, the entering the card insert interrupt and setting the card slot state identification as with-card identification, specifically comprises:

entering the card insert interrupt, determining whether the sleep identification is set, if the sleep identification is set, resetting the sleep identification, waking up the MCU, setting the card slot state identification as with-card identification, determining whether the USB channel connection identification is set, if yes, writing a card insert response to the INT endpoint, exiting the card insert interrupt; if no, exiting the card insert interrupt; if the sleep identification is not set, setting the card slot state identification as with-card identification, determining whether the USB channel connection identification is set, if yes, writing the card insert response to the INT endpoint, exiting the card insert interrupt; if no, exiting the card insert interrupt;

the entering the card pull-out interrupt and setting the card slot state identification as without-card identification, specifically comprises:

entering the card pull-out interrupt, setting the card slot state identification as without-card identification, determining whether the USB channel connection identification is set, if yes, writing the card pull-out response to the INT endpoint, setting the sleep identification, the MCU sleeping, exiting the card pull-out interrupt; if no, setting the sleep identification, the MCU sleeping, exiting the card pull-out interrupt;

Step A further comprises enabling a timer interrupt, when the card reader receives a timer interrupt signal, entering the timer interrupt, clearing a counter value, setting the sleep identification, the MCU sleeping, exiting the timer interrupt.

Preferably, the entering the USB communication interrupt, receiving the instruction through the USB channel, performing corresponding operation upon the received instruction, returning operation result to the upper computer through the USB channel, specifically comprises:

entering the USB communication interrupt, receiving the instruction through the USB channel, parsing the received instruction, determining type of the instruction, if the type is card slot state inquiring instruction, inquiring, by the card reader, the card slot state, setting preset bytes of card slot state data, returning the set card slot data to the upper computer through the USB channel; if the type is power-up instruction, powering, by the card reader, up the card slot, reading a power-up response, returning the power-up response to the upper computer through the USB channel; if the type is power-off instruction, powering, by the card reader, off the card slot, reading a power-off response, returning the power-off response to the upper computer through the USB channel; if the type is card operating instruction, sending, by the card reader, the card operating instruction to the card, receiving a card operating response returned from the card, returning the card operating response to the upper computer through the USB channel, if the type is another instruction, performing corresponding operation;

entering the Bluetooth communication interrupt, receiving the instruction through the Bluetooth channel, performing corresponding operation upon the received instruction and returning operation result to the upper computer through the Bluetooth channel, specifically comprises:

entering the Bluetooth communication interrupt, receiving the instruction through the Bluetooth channel, parsing the received instruction, determining the type of the instruction, if the type is card slot state inquiring instruction, inquiring, by the card reader, the card slot state, setting the preset bytes of the card slot state data, returning the set card slot data to the upper computer through the Bluetooth channel; if the type is power-up instruction, powering, by the card reader, up the card slot, reading the power-up response, returning the power-up response to the upper computer through the Bluetooth channel; if the type is the power-off instruction, powering, by the card reader, off the card slot, reading the power-off response, returning the power-off response to the upper computer through the Bluetooth channel; if the type is card operating instruction, sending, by the card reader, the card operating instruction to the card, receiving the card operating response returned from the card, returning the card operating response to the upper computer through the Bluetooth channel, if the type is Bluetooth module parameter information inquiring instruction, sending the parameters of the Bluetooth module to the upper computer through the Bluetooth channel, waiting for new parameters of the Bluetooth module issued by the upper computer, disconnecting the connection of the Bluetooth module after receiving the new parameters, writing the new parameters, switching the Bluetooth module into connecting state; if the type is another instruction, performing corresponding operation.

Preferably, the entering the USB communication interrupt, receiving the instruction through the USB channel, performing corresponding operation upon the received instruction, returning the operating result to the upper computer through the USB channel, specifically comprises:

entering the USB communication interrupt, receiving the instruction through the USB channel, parsing the received instruction, determining the type of the instruction, if the type is channel switching instruction, enabling the Bluetooth connection interrupt;

the entering the Bluetooth communication interrupt, receiving the instruction through the Bluetooth channel, performing corresponding operation upon the received instruction, returning the operation result to the upper computer through the Bluetooth channel, specifically comprises:

entering the Bluetooth communication interrupt, receiving the instruction through the Bluetooth channel, parsing the received instruction, determining the type of the instruction, if the type is the channel switching instruction, enabling the USB insert interrupt, if the type is another instruction, performing corresponding operation.

Preferably, the parameters of the Bluetooth module specifically comprises: content of MAC, PIN and name of the card reader device;

determining whether the reading is successful, specifically comprises, determining, by the card reader, whether reading is successful upon the preset bytes in the parameters of the Bluetooth module, determining that the reading is successful if the value of the preset bytes in the parameters of the Bluetooth module equals the preset bytes; determining that the reading is not successful if the value of the preset bytes in the parameters of the Bluetooth module does not equal the preset bytes.

Preferably, said sleeping the MCU, specifically comprises:

increasing frequency dividing value, decreasing the frequency of bus clock, switching the level of kernel voltage of MCU into state of which the voltage category is 1, disabling peripherals of a first serial communication interface and a second serial communication interface, then sleeping the MCU.

In another aspect of this invention, there is provided a method for a card reader to communicate with an upper computer, which comprises:

Step S1, initializing a card reader system, enabling card insert interrupt, card pull-out interrupt, USB insert interrupt, USB pull-out interrupt, Bluetooth connection interrupt, Bluetooth disconnection interrupt, timer interrupt, USB communication interrupt, and/or Bluetooth communication interrupt;

Step S2, determining whether work voltage is lower than a preset value, if the work voltage is lower than a preset value, prompting low power state, when the low power state overpasses a first preset time, closing the card reader; if the work voltage is not lower than the preset value, going to Step S3;

Step S3, determining whether a set interrupt identification exists, if the set interrupt identification exists, going to Step S4; otherwise, going back to Step S2;

in which the interrupt identification comprises card insert interrupt identification, card pull-out interrupt identification, USB insert interrupt identification, USB pull-out interrupt identification, Bluetooth connection interrupt identification, Bluetooth disconnection interrupt identification, Bluetooth communication interrupt identification, USB communication interrupt identification, and timer interrupt identification;

Step S4, detecting the type of the set interrupt identification;

if the type is the Bluetooth communication interrupt identification or the USB communication interrupt identification, going to Step S5; if the type is another interrupt identification, performing corresponding operation upon the type of the set interrupt identification, going back to Step S2;

Step S5, receiving an instruction and saving a channel identification corresponding to the instruction, performing corresponding operation upon the type of the instruction, sending corresponding response to the upper computer, clearing the corresponding interrupt identification, going back to Step S2.

Preferably, when the card reader receives a card insert interrupt signal, setting the card insert interrupt identification;

when the card reader receives a card pull-out interrupt signal, setting the card pull-out interrupt identification;

when the card reader receives a USB insert interrupt signal, setting the USB insert interrupt identification;

when the card reader receives a USB pull-out interrupt signal, setting the USB pull-out interrupt identification;

when the card reader receives a Bluetooth connection interrupt signal, setting the Bluetooth connection interrupt identification;

when the card reader receives a Bluetooth disconnection signal, setting the Bluetooth disconnection interrupt identification;

when the card reader receives a Bluetooth communication interrupt signal, setting the Bluetooth communication interrupt identification; and when the card reader receives a USB communication interrupt signal, setting the USB communication interrupt identification.

Preferably, between Step S2 and Step S3, the method comprises:

Step S2', reading the parameters of the Bluetooth module, determining whether reading is successful, if yes, switching the Bluetooth module into connection state, going to Step S3; if no, setting a USB channel identification, going to Step S2; or Step S2", reading the parameters of the Bluetooth module, determining whether reading is successful, if yes, switching the Bluetooth module into connection state, going to Step S3; if no, going back to Step S2".

Preferably, if the type is another interrupt identification, performing corresponding operation upon the type of the set interrupt identification, going back to Step S2, specifically comprises:

if the set interrupt identification is that the USB insert interrupt identification is set, determining whether a sleep identification is set, if yes, resetting the sleep identification, waking up MCU, enabling USB channel, setting the USB channel connection identification, resetting the USB insert interrupt identification, going back to Step S2, if no, enabling the USB channel, setting the USB channel connection identification, resetting the USB insert interrupt identification, going back to Step S2;

if the set interrupt identification is that the USB pull-out interrupt identification is set, determining whether a Bluetooth connection identification is set, if yes, disabling the USB channel, resetting the USB channel connection identification, resetting the USB pull-out identification, going back to Step S2; if no, disabling the USB channel, resetting the USB channel connection identification, resetting the USB pull-out interrupt identification, setting the sleep identification, MCU sleeping;

if the set interrupt identification is that the Bluetooth connection interrupt identification is set, determining whether the sleep identification is set, if yes, resetting the sleep identification, waking up the MCU, enabling the Bluetooth channel, setting the Bluetooth channel connection identification, resetting the Bluetooth connection interrupt identification, going back to Step S2; if no, enabling the Bluetooth channel, setting the Bluetooth channel connection identification, resetting the Bluetooth connection interrupt identification, going back to Step S2;

if the set interrupt identification is that the Bluetooth disconnection interrupt identification is set, determining whether the USB channel connection identification is set, if yes, disabling the Bluetooth channel, resetting the Bluetooth channel connection identification, resetting the Bluetooth channel disconnection identification, going back to Step S2; if no, disabling the Bluetooth channel, resetting the Bluetooth channel connection identification, resetting the Bluetooth disconnection interrupt identification, setting the sleep identification, then sleeping the MCU.

Preferably, between Step S2' and Step S3, or between Step S2" and Step S3, the method comprises, Step S3', detecting the connection way between the card reader and the upper computer;

if the card reader connects to the upper computer through the USB interface, setting, by the card reader, the USB channel connection identification, going to Step S3; if the card reader connects to the upper computer through the Bluetooth module, setting the Bluetooth channel connection identification, going to Step S3;

if the type is another interrupt identification, performing corresponding operation upon the type of the set interrupt identification, going back to Step S2 comprise:

if the set interrupt identification is the USB insert interrupt identification, determining whether the sleep identification is set, if the sleep identification is set, resetting the sleep identification, waking up the MCU, enabling the USB channel, setting the USB channel connection identification, disabling the Bluetooth connection interrupt, determining whether the Bluetooth channel connection identification is set, if the Bluetooth channel connection identification is set, resetting the Bluetooth channel connection identification, resetting the USB insert interrupt identification, going back to Step S2; if the Bluetooth channel connection identification is not set, resetting the USB insert interrupt identification, going back to Step S2;

if the sleep identification is not set, determining whether the Bluetooth channel connection identification is set, if yes, resetting the Bluetooth channel connection identification, disabling the Bluetooth connection interrupt, enabling the USB channel, setting the USB channel connection identification, resetting the USB insert interrupt identification, going back to Step S2; if no, disabling the Bluetooth connection interrupt, enabling the USB channel, setting the USB channel connection identification, resetting the USB insert interrupt identification, going back to Step S2;

if the set interrupt identification is USB pull-out interrupt identification, disabling the USB channel, resetting the USB channel connection identification, enabling the Bluetooth connection interrupt, resetting the USB pull-out interrupt identification, setting the sleep identification, the MCU sleeping;

if the set interrupt identification is the Bluetooth connection interrupt identification, determining whether the sleep identification is set, if yes, resetting the sleep identification, waking up the MCU, enabling the Bluetooth channel, setting the Bluetooth channel connection identification, resetting the Bluetooth connection interrupt identification, going back to Step S2; if no, enabling the Bluetooth channel, setting the Bluetooth channel connection identification, resetting the Bluetooth connection interrupt identification, going back to Step S2; and if the set interrupt identification is the Bluetooth disconnection interrupt identification, disabling the Bluetooth channel, resetting the Bluetooth channel connection identification, resetting the Bluetooth disconnection interrupt identification, setting the sleep identification, then sleeping the MCU.

Preferably, between Step S2' and Step S3, or between Step S2" and Step S3, the method comprises:

Step S3", detecting the connection way between the card reader and the upper computer;

if the card reader connects to the upper computer through the Bluetooth channel, setting, by the card reader, the Bluetooth channel connection identification, going to Step S3; if the card reader connects to the upper computer through the USB interface, setting the USB channel connection identification, going to Step S3;

if the type is another interrupt identification, performing corresponding operation upon the type of the set interrupt identification, going back to Step S2, comprises:

if the set interrupt identification is that the set USB insert interrupt identification, determining whether the sleep identification is set, if yes, resetting the sleep identification, waking up the MCU, enabling the USB channel, setting the USB channel connection identification, resetting the USB insert interrupt identification, going back to Step S2; if no, enabling the USB channel, setting the USB channel connection identification, resetting the USB insert interrupt identification, going back to Step S2;

if the set interrupt identification is the USB pull-out interrupt identification, resetting the USB channel connection identification, setting the sleep identification, resetting the USB pull-out interrupt identification, sleeping the MCU;

if the set interrupt identification is the Bluetooth connection interrupt identification, determining whether the sleep identification is set, if yes, resetting the sleep identification, waking up the MCU, enabling the Bluetooth channel, setting the Bluetooth channel connection identification, disabling the USB insert interrupt, resetting the Bluetooth connection interrupt identification, going back to Step S2; if no, determining whether the USB channel connection identification is set, if the USB channel connection identification is set, resetting the USB channel connection identification, enabling the Bluetooth channel connection identification, setting the Bluetooth channel connection identification, disabling the USB insert interrupt, resetting the Bluetooth connection interrupt identification, going back to S2; if the USB channel connection identification is not set, enabling the Bluetooth channel, setting the Bluetooth channel connection identification, disabling the USB insert interrupt, resetting the Bluetooth connection interrupt identification, going back to Step S2;

if the set interrupt identification is the Bluetooth disconnection interrupt identification, disabling the Bluetooth channel, resetting the Bluetooth channel connection identification, enabling the USB insert interrupt, resetting the Bluetooth disconnection interrupt identification, setting the sleep identification, sleeping the MCU.

Preferably, if the type is another interrupt identification, performing corresponding operation upon the type of the set interrupt identification, going back to Step S2, comprises:

if the set interrupt identification is the USB insert interrupt identification, determining whether the sleep identification is set, if the sleep identification is set, resetting the sleep identification, waking up the MCU, enabling the USB channel, setting the USB channel connection identification, disabling the Bluetooth connection interrupt, resetting the USB insert interrupt identification, going back to Step S2; if the sleep identification is not set, enabling the USB channel, setting the USB channel connection identification, disabling the Bluetooth connection interrupt, resetting the USB insert interrupt identification, going back to Step S2;

if the set interrupt identification is the USB pull-out interrupt identification, disabling the USB channel, resetting the USB channel connection identification, enabling the Bluetooth connection interrupt, resetting the USB pull-out interrupt identification, setting the sleep identification, the MCU sleeping;

if the set interrupt identification is the Bluetooth connection interrupt identification, determining whether the sleep identification is set, if yes, resetting the sleep identification, waking up the MCU, enabling the Bluetooth channel, setting the Bluetooth channel connection identification, disabling the USB insert interrupt, resetting the Bluetooth connection interrupt identification, going back to Step S2; otherwise, enabling the Bluetooth channel, setting the Bluetooth channel connection identification, disabling the USB insert interrupt, resetting the Bluetooth connection interrupt identification, going back to Step S2;

if the set interrupt identification is the Bluetooth disconnection interrupt identification, disabling the Bluetooth channel, resetting the Bluetooth channel connection identification, enabling the USB insert interrupt, resetting the Bluetooth disconnection interrupt identification, setting the sleep identification, sleeping the MCU.

Preferably, if the type is another interrupt identification, performing corresponding operation upon the type of the set interrupt identification, going back to Step S2, comprises:

if the set interrupt identification is the card insert interrupt identification, determining whether the sleep identification is set, if the sleep identification is set, resetting the sleep identification, waking up the MCU, setting the card slot state identification as with-card identification, determining whether the USB channel connection identification is set, if yes, writing a card insert response to the INT endpoint, resetting the card insert interrupt identification, going back to Step S2; if no, resetting the card insert interrupt identification, going back to Step S2; if the sleep identification is not set, determining whether the USB channel connection identification is set, if yes, writing the card insert interrupt response to the INT endpoint, going back to Step S2; if no, resetting the card insert interrupt identification, going back to Step S2;

if the set interrupt identification is the card pull-out interrupt identification, setting the card slot state identification as without-card identification, determining whether the USB channel connection identification is set, if yes, writing a card pull-out response to the INT endpoint, resetting the card pull-out interrupt identification, setting the sleep identification, the MCU sleeping; if no, resetting the card pull-out interrupt identification, setting the sleep identification, sleeping the MCU;

if the set interrupt identification is the timer interrupt identification, clearing a counter value, resetting the timer interrupt identification, setting the sleep identification, sleeping the MCU.

Preferably, the Step S5 specifically comprises:

a, when an instruction is received through the USB channel, setting the USB channel identification, when the instruction is received through the Bluetooth channel, setting the Bluetooth channel identification;

b, performing corresponding operation upon the type of the instruction, sending a corresponding response to the upper computer, clearing the corresponding interrupt identification, comprises:

if the received instruction is a card slot state inquiring instruction, inquiring the card slot state, setting preset bytes of card slot state data, detecting the type of the current set channel identification; if the type is the Bluetooth channel identification, sending the card slot state data to the upper computer through the Bluetooth channel, resetting the Bluetooth channel identification, resetting the Bluetooth channel interrupt identification; if the type is the USB channel identification, sending the card slot state data to the upper computer through the USB channel, resetting the USB channel identification, resetting the USB communication interrupt identification;

if the received instruction is a power-up instruction, powering up the card slot, reading a power-up response, detecting the type of the current set channel identification, if the type is the Bluetooth channel identification, sending the power-up response to the upper computer through the Bluetooth channel, resetting the Bluetooth channel identification, resetting the Bluetooth communication interrupt identification; if the type is the USB channel identification, sending the power-up response to the upper computer through the USB channel, resetting the USB channel identification, resetting the USB communication interrupt identification;

if the received instruction is a power-off instruction, powering off the card slot, reading a power-off response, detecting the type of the current set channel identification, if the type is the Bluetooth channel identification, sending the power-off response to the upper computer through the Bluetooth channel, resetting the Bluetooth channel identification, resetting the Bluetooth communication interrupt identification; if the type is the USB channel identification, sending the power-off response to the upper computer through the USB channel, resetting the USB channel identification, resetting the USB communication interrupt identification;

if the received instruction is a card operating instruction, sending the card operating instruction to the card, receiving a card operation response returned from the card, detecting the type of the current set channel identification, if the type is the Bluetooth channel identification, sending the card operation response to the upper computer through the Bluetooth channel, resetting the Bluetooth channel identification, resetting the Bluetooth channel interrupt identification; if the type is the USB channel identification, sending the card operation response to the upper computer through the USB channel, resetting the USB channel identification, resetting the USB communication interrupt identification;

if the received instruction is a Bluetooth module parameter information inquiring instruction, determining whether the Bluetooth channel identification is set, if yes, sending the parameters of the Bluetooth module to the upper computer though the Bluetooth channel, waiting for receiving new parameters of the Bluetooth module issued by the upper computer, disconnecting the Bluetooth module, writing the new parameters, switching the Bluetooth module into connection state; resetting the Bluetooth channel identification, resetting the Bluetooth communication interrupt identification; if no, reporting error.

Preferably, the Step S5 further comprises:

a', when the USB channel receives the instruction, setting the USB channel identification; when the Bluetooth channel receives the instruction, setting the Bluetooth channel identification;

b', performing corresponding operation upon the type of the instruction, sending the corresponding response to the upper computer, clearing corresponding interrupt identification comprises:

if the received instruction is a channel switching instruction, detecting whether the current set channel identification is the Bluetooth channel identification, if yes, disabling the Bluetooth channel, resetting the Bluetooth channel identification, enabling the USB channel, setting the USB channel identification, resetting the USB communication interrupt identification; if no, disabling the USB channel, resetting the USB channel identification, enabling the Bluetooth channel, resetting the Bluetooth channel identification.

Preferably, the parameters of the Bluetooth module specifically comprises: content of MAC, PIN and name of the card reader device;

determining whether the reading is successful, specifically comprises, determining, by the card reader, whether reading is successful upon the preset bytes in the parameters of the Bluetooth module, determining that the reading is successful if the value of the specified bytes in the parameters of the Bluetooth module equals the preset bytes; determining that the reading is not successful if the value of the specified bytes of the parameters of the Bluetooth module does not equal the preset bytes;

when the card reader connects to the upper computer through the USB interface, the card reader is charged through the USB interface.

Preferably, sleeping the MCU specifically comprises:

increasing frequency dividing value, decreasing the frequency of bus clock, switching the level of kernel voltage of MCU into state of which the voltage category is 1, disabling peripherals of a first serial communication interface and a second serial communication interface, sleeping the MCU.

According to the present invention, a card reader can communicate with an upper computer through USB interface or Bluetooth module and set parameters of the Bluetooth module in the process of communication between the Bluetooth module and the upper computer. By the present invention, the card reader can communicate with different types of mobile devices through the USB interface.

BRIEF DESCRIPTION OF THE DRAWINGS

FIG. 2-1 to FIG. 2-10 provide a flow chart of a method for a card reader to communicate with an upper computer of Embodiment 2 of the present invention.

DETAILED DESCRIPTION OF THE PRESENT INVENTION

The technical solutions of the embodiments of the disclosure are described clearly and completely in conjunction with the accompanying drawings as follows.

The card reader of the present invention can be a contact card reader or a contactless card reader. As an example, the card reader in the embodiments of the present invention is a contact card reader.

Figure 1:
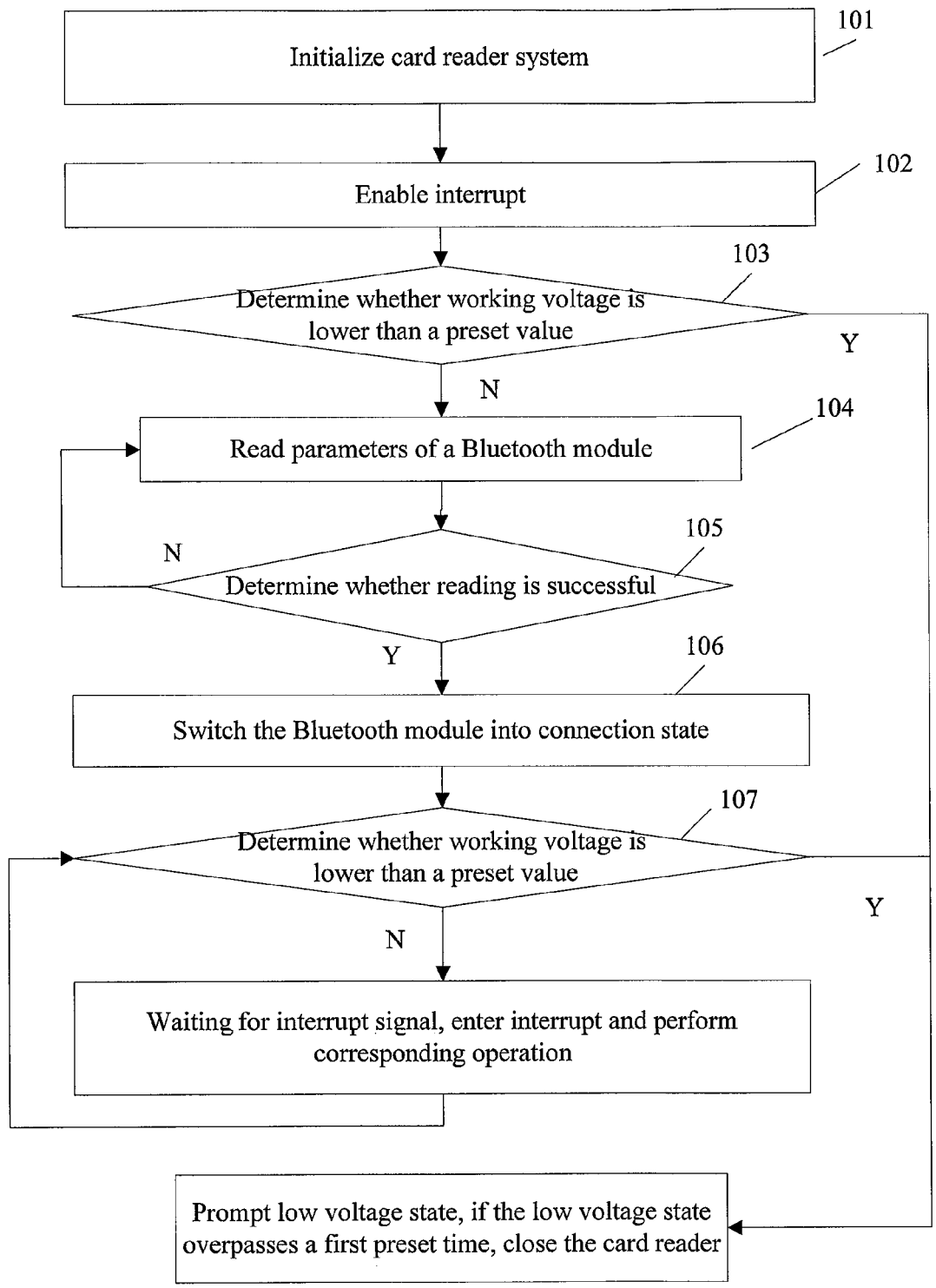
FIG. 1-1 to FIG. 1-10 provide a flow chart of a method for a card reader to communicate with an upper computer of Embodiment 1 of the present invention.

Embodiment 1:

As shown in FIG. 1-1, the present invention provides a method for a card reader communicates to an upper computer, includes:

Step 101, initializing the card reader system;

In Embodiment 1, the system configures a process clock, a timer clock, IO interface, serial interface, USB interface;

Step 102, enabling interrupt;

In Embodiment 1, the card reader enabling card insert interrupt, card pull-out interrupt, USB insert interrupt, USB pull-out interrupt, Bluetooth disconnection interrupt, timer interrupt, USB communication interrupt, and/or Bluetooth communication interrupt.

Step 103, determining whether work voltage is lower than a preset value, if the work voltage is lower than the preset value, prompting low voltage state, if the low work voltage state overpasses a first preset time, closing the card reader; if the work voltage is not lower than the preset value, going back to Step 104;

In Embodiment 1, a low work voltage can be prompted by being displayed by a screen and/or low work voltage can be prompted by changing of color of instructive lamp and/or low work voltage can be prompted by beeping and/or low work voltage can be prompted by voice. The first preset time can be 30s.

Step 104, reading parameters of a Bluetooth module;

In Embodiment 1, reading content of MAC, PIN and name of the card reader device.

Step 105, determining whether reading is successful;

if yes, going to Step 106; if no, going back to Step 104.

In Embodiment 1, the card reader reads the parameters of the Bluetooth module from the Bluetooth module, determines whether reading is successful upon the last byte of parameters of the Bluetooth module. If the last byte of the parameters of the Bluetooth module is 0X00, the reading, by the card reader, of the parameters of the Bluetooth module is successful; if no, the reading, by the card reader, of the parameters of the Bluetooth module is not successful.

Step 105 also can be reading parameters of the Bluetooth module, determining whether reading is successful, if yes, going to Step 106; if no, setting the USB channel identification, then going to Step 107.

Step 106, switching the Bluetooth module into connection state/status;

In Embodiment 1, disabling a Bluetooth module state output pin.

Step 107, determining whether work voltage is lower than a preset value;

if yes, prompting low work voltage state, if the low work voltage state overpasses a preset time, close the card reader; if no, waiting for receiving interrupt signal, entering the interrupt and performing corresponding operation, going back to Step 107.

Figures 1, 2:
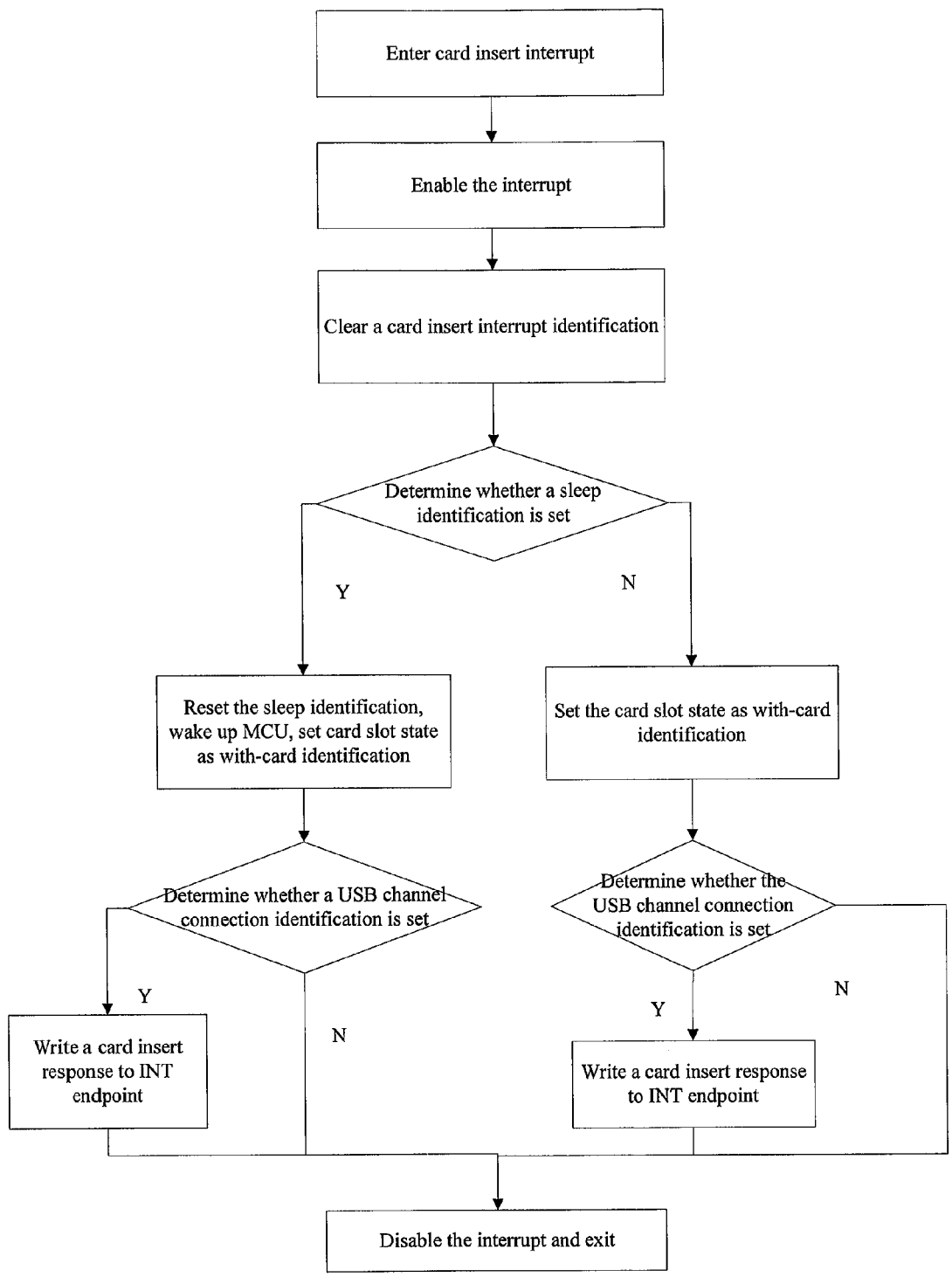
Figures 1, 2, 3:
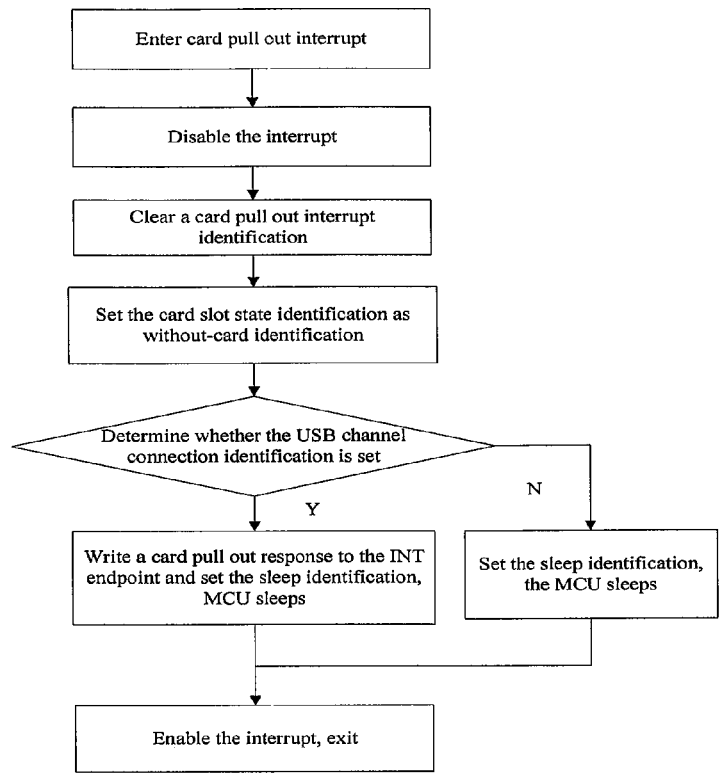

In Embodiment 1, waiting for receiving interrupt signal, entering the interrupt and performing corresponding operation specifically comprises:

as shown in FIG. 1-2, when a card-in-slot pin of the card reader is high level, entering card insert interrupt, disabling the interrupt, clearing a card insert interrupt identification, determining whether a sleep identification is set, if yes, resetting the sleep identification, waking up a MCU, setting a card slot state identification as with-card identification, determining whether a USB channel connection identification is set, if yes, writing a card insert response to an INT endpoint, enabling the interrupt, exiting the card insert interrupt; if no, enabling the interrupt, exiting the card insert interrupt.

if the sleep identification is not set, setting the card slot state identification as a with-card identification/card-in-slot identification, determining whether the USB channel connection identification is set, if yes, writing the card insert response to the INT endpoint, enabling the interrupt, exiting the card insert interrupt; if no, enabling the interrupt, exiting the card insert interrupt;

As shown in FIG. 1-3, when the card-in-slot pin of the card reader is low level, entering the card pull-out interrupt, disabling the interrupt, clearing a card pull-out interrupt identification, setting the card slot state identification as a without-card identification/Card-not-in-slot identification, determining whether the USB channel connection identification is set, if yes, writing the card pull-out response to the INT endpoint, setting the sleep identification, the MCU sleeping, enabling the interrupt, exiting the card pull-out interrupt; if no, setting the sleep identification, sleeping the MCU, enabling the interrupt, exiting the card pull-out interrupt;

In the present Embodiment 1, switching into the sleep state operation specifically comprises: increasing frequency dividing value, decreasing the frequency of bus clock, switching the level of kernel voltage of the MCU into state of which the voltage category is 1, disabling peripherals of a first serial communication interface and a second serial communication interface, switching the MCU in sleep state/status.

For the Bluetooth module, if the Bluetooth module is in connection state, the Bluetooth module switches to regular monitoring mode; if the Bluetooth module is disconnection state/status, the state is holding.

As shown in FIG. 1-4, when the USB power delivery pin is high level, enter USB insert interrupt processing, disable the interrupt, clear the USB insert interrupt identification, determine whether the sleep identification is set, if yes, reset the sleep identification, wake up the MCU, enable USB channel, set the USB channel connection identification, enable the interrupt, exit the USB insert interrupt; if no, enable the USB channel, set the USB channel connection identification, enable the interrupt, exit the USB insert interrupt;

As shown in FIG. 1-5, when the USB power delivery pin of the card reader is low level, enter the USB pull-out interrupt, disable the interrupt, clear the USB pull-out interrupt identification, determine whether the Bluetooth channel connection identification is set, if yes, disable the USB channel, reset the USB channel connection identification, enable the interrupt, exit the USB pull-out interrupt; if no, disable the USB channel, reset the USB channel connection identification, set the sleep identification, the MCU is sleeping; if no, disable the USB channel, reset the USB channel connection identification, set the sleep identification, the MCU is sleep, open the interrupt, exit the USB pull-out interrupt;

As shown in FIG. 1-6, when the level of the Bluetooth module state output pin becomes high level, enter the Bluetooth connection interrupt, enable the interrupt, clear the Bluetooth connection interrupt identification, determine whether the sleep identification is set, if yes, reset the sleep identification, wake up the MCU, enable the Bluetooth channel, set the Bluetooth channel connection identification, enable the interrupt, exit the Bluetooth connection interrupt; if no, enable the Bluetooth channel, set the Bluetooth channel connection identification, enable the interrupt, exit the Bluetooth connection interrupt;

As shown in FIG. 1-7, when the level of the Bluetooth module state output pin becomes low level, enter the Bluetooth disconnection interrupt, disable the interrupt, clear the Bluetooth disconnection interrupt identification, determine whether the USB channel connection identification is set, if yes, disable the Bluetooth channel, reset the Bluetooth channel connection identification, enable the interrupt, exit the Bluetooth disconnection interrupt; if no, disable the Bluetooth channel, reset the Bluetooth channel connection identification, set the sleep identification, the MCU is sleeping, enable the interrupt, exit the Bluetooth disconnection interrupt;

As shown in FIG. 1-8, when the card reader receives triggering of a timer, enter the timer interrupt, disable the interrupt, clear the timer interrupt identification, clear a counter value, set the sleep identification, enter the interrupt, exit the timer interrupt;

As shown in FIG. 1-9, when the card reader receives an instruction through the USB channel, enter the USB communication interrupt, which specifically includes following steps:

Step 108-1, disable the interrupt;

Step 109-1, clear the interrupt;

In Embodiment 1, specifically, clear the USB communication interrupt identification;

Step 110-1, parse the received instruction, determine the type of the instruction;

In Embodiment 1, determine the type of the instruction upon the value of the first byte of the instruction.

if the first byte of the instruction is 0X65, the instruction is an card slot state inquiring instruction, go to Step 111-1;

if the first byte of the instruction is 0X62, the instruction is a power-up instruction, go to Step 113-1;

if the first byte of the instruction is 0X63, the instruction is a power-off instruction, go to Step 116-1;

if the first byte of the instruction is 0X6f, the instruction is a card operating instruction, go to Step 119-1;

if the instruction is another instruction, perform corresponding operation, enable the interrupt, and exit the USB communication interrupt;

Step 111-1, check the card slot state, set the preset byte of the card slot state;

In Embodiment 1, determine the card slot state upon the state of IO interface.

If the IO interface is high level, it represents without-card state, set the preset byte of the card slot state data as 0X02;

If the IO interface is low level and the specified flag is 0, it represents that a card is in the card slot and the card is activated, the preset byte of the card slot state is set as 0X00;

If the IO interface is low level and the specified flag is 1, it represents that the card is in the card slot and the card is inactivated, the preset byte of the card slot state data is set as 0X01.

The preset byte of the card slot state data can be the eighth byte.

Step 112-1, send the card slot state data to the upper computer through the USB channel, then enable the interrupt, exit the USB channel interrupt;

Step 113-1, determine whether the card is in the card slot, if yes, power-up the card slot, then go to Step 114-1; if no card is in the card slot, send a without-card response to the upper computer, then enable the interrupt, exit the USB communication channel;

In Embodiment 1, check the card slot state identification, if the card identification is the with-card identification, it represents that the card is in the card slot; otherwise, it represents that no card is in the card slot.

Step 114-1, read a power-up response;

In Embodiment 1, read the power-up response including card information, for example, 800c00000000120000003bf095000081b1fe9a1f0729;

Step 115-1, send the power-up response to the upper computer through the USB channel, then enable interrupt and exit the USB communication interrupt;

Step 116-1, power off the card slot;

Step 117-1, read a power-off response;

In Embodiment 1, the first byte of the power-off response is 0X81, for example, 81000000000004010000.

Step 118-1, send the power-off response to the upper computer through the USB channel, then enable the interrupt, exit the USB communication interrupt;

Step 119-1, send the card operating instruction to the card;

In Embodiment 1, the card reader sends the received card operating instruction, which has not been done any process, to the card directly.

Step 120-1, receive the card operating response returned from the card;

In Embodiment 1, the card operating response, with which the first byte is 0X80, returned from the card is received. For example, 8005000000001800000000e101f010;

Step 121-1, send the card operating response to the upper computer through the USB channel, then enable the interrupt, exit the USB channel interrupt.

As shown in FIG. 1-10, when the card reader received the instruction through the Bluetooth channel, enter the Bluetooth channel interrupt, specifically the operation is as the following:

Step 108-2, disable the interrupt;

Step 109-2, clear the interrupt;

In Embodiment 1, specifically the Bluetooth communication interrupt identification is cleared.

Step 110-2, parse the received instruction, determine the type of the received instruction;

In Embodiment 1, the detailed determining method is identical to Step 110-1;

if the instruction is the card slot state inquiring instruction, go to Step 111-2;

if the instruction is the power-up instruction, go to Step 113-2;

if the instruction is the power-off instruction, go to Step 116-2;

if the instruction is the card operating instruction, go to Step 119-2;

if the received first byte is 0X5A, the further byte is 0X61, the instruction is the Bluetooth module parameter information inquiring instruction, go to Step 122-2;

if the instruction is another instruction, perform corresponding operation, enable the interrupt, exit the Bluetooth communication interrupt.

Step 111-2, inquire the card slot state and set the preset byte of the card slot state data;

In Embodiment 1, specific operation of Step 111-2 is identical to the Step 111-1.

Step 112-2, send the card slot state data to the upper computer through the Bluetooth channel, then enable the interrupt, exit the Bluetooth channel interrupt;

Step 113-2, determine whether the card is in the card slot, if yes, power-up the card slot, then go to Step 114-2; if the card is not in the card slot, send a without-card response to the upper computer, then enable the interrupt and exit the Bluetooth communication interrupt;

In Embodiment 1, inquiring the card slot state identification, if the identification is a with-card identification, it represents that card is in the card slot; otherwise, it represents that no card is in the card slot;

Step 114-2, read the power-up response;

In Embodiment 1, the specific operation is identical to the Step 114-1.

Step 115-2, send the power-up response to the upper computer through the Bluetooth channel, then enable the interrupt, exit the Bluetooth communication interrupt;

Step 116-2, power-off the card slot;

Step 117-2, read the power-off response;

In Embodiment 1, specific operation is identical to the Step 117-1.

Step 118-2, send the power-off response to the upper computer through the Bluetooth channel, then enable the interrupt, exit the Bluetooth communication interrupt;

Step 119-2, send the card operating instruction to the card;

In Embodiment 1, the card reader sends the received card operating instruction, which has not been done any process, to the card directly.

Step 120-2, receive the card operation response returned from the card;

In Embodiment 1, specific operation is identical to the Step 120-1;

Step 121-2, send card operation response to the upper computer through the Bluetooth channel, then enable the interrupt, exit the Bluetooth communication interrupt;

Step 122-2, send parameters of the Bluetooth module to the upper computer through the Bluetooth channel;

In Embodiment 1, specifically, the parameters containing MAC content, card reader device name and the PIN, of which the first byte is 0XA5 and the fourth byte is 0X62, of the Bluetooth module are sent to the upper computer.

Step 123-2, receive new parameters of the Bluetooth module;

Step 124-2, disconnect the Bluetooth module, write the new parameters, then switch the Bluetooth module into connection state, then enable the interrupt, exit the Bluetooth communication interrupt.

It should be noted that, in Embodiment 1, before going back to Step 107, the method further includes Step 107', Step 107', detect the connection way between the card reader and the upper computer;

if the card reader connects to the upper computer through the USB interface, the card reader sets the USB channel connection identification, going back to Step 107; if the card reader connects to the upper computer through the Bluetooth module, the card reader sets the Bluetooth channel connection identification, going back to Step 107, Correspondingly, when the USB power delivery pin of the card reader is high level, entering the USB insert interrupt further includes:

when the USB power delivery pin of the card reader becomes high level, entering the USB insert interrupt, disable the interrupt, clearing the USB insert interrupt identification, determining whether the sleep identification is set, if the sleep identification is set, resetting the sleep identification, waking up the MCU, enabling the USB channel, setting the USB channel connection identification, determining whether the Bluetooth channel connection identification is set, if the Bluetooth channel connection identification is set, resetting the Bluetooth channel connection identification, exiting the USB insert interrupt processing, enable the interrupt, disable the Bluetooth connection interrupt, exit the USB insert interrupt process; if the Bluetooth channel connection identification is not set, enabling the interrupt, disabling the Bluetooth connection interrupt, exiting the USB insert interrupt;

if the sleep identification is not set, determining whether the Bluetooth channel connection is set, if yes, resetting the Bluetooth channel connection identification, enabling the USB channel, setting the USB channel connection identification, enabling the interrupt, disabling the Bluetooth connection interrupt, exiting the USB insert interrupt; if no, setting the USB channel connection identification, enabling the interrupt, disabling the Bluetooth connection interrupt, exiting the USB insert interrupt.

When the USB power delivery pin of the card reader is low level, entering the USB interrupt further includes:

entering the USB pull-out interrupt, disabling the interrupt, clearing the USB interrupt identification, disabling the USB channel, resetting the USB channel connection identification, setting the sleep identification, MCU sleeping, enabling the interrupt, wherein the enabling interrupt must secure enabling the Bluetooth connection interrupt, exiting the USB pull-out interrupt.

When the level of the Bluetooth module state output pin becomes high level, entering the Bluetooth connection interrupt further includes:

entering the Bluetooth connection interrupt, disabling the interrupt, clearing the Bluetooth connection interrupt identification, determining whether the sleep identification is set, if yes, resetting the sleep identification, waking up MCU, enabling the Bluetooth channel connection, setting the Bluetooth channel connection identification, enabling the interrupt, exiting the Bluetooth connection interrupt; if no, enabling the Bluetooth channel, setting the Bluetooth channel connection identification, enabling the interrupt, exiting the Bluetooth connection interrupt.

When the Bluetooth module state output pin becomes low level, entering the Bluetooth disconnection interrupt further includes:

entering Bluetooth disconnection interrupt, disabling the interrupt, clearing the Bluetooth disconnection interrupt identification, disabling the Bluetooth channel, resetting the Bluetooth channel connection identification, setting the sleep identification, the MCU sleeping, enabling the interrupt, exiting the Bluetooth disconnection interrupt. Above implementing way can realize the present invention as well.

It should be noted that, before going back to Step 107, the method further includes Step 107", Step 107", detecting the connection way between the card reader and the upper computer, if the card reader connects to the upper computer through the Bluetooth module, setting, by the card reader, the Bluetooth channel connection identification, going back to Step 107; if the card reader connects to the Bluetooth module through the USB interface, setting the USB channel connection identification, going back to Step 107;

Correspondingly, when the USB power delivery pin of the card reader becomes low level, entering the USB pull-out interrupt process specifically includes:

when the USB power delivery pin of the card reader becomes low level, entering the USB pull-out interrupt, disabling the interrupt, clearing the USB pull-out interrupt identification, disabling the USB channel, resetting the USB channel connection identification, setting the sleep identification, the MCU sleeping, enabling the interrupt, exiting the USB pull-out interrupt.

When the level of the Bluetooth module state output pin becomes high level, entering the Bluetooth connection interrupt specifically includes:

when the level of the Bluetooth module state output pin becomes high level, entering the Bluetooth connection interrupt, disabling the interrupt, clearing the Bluetooth connection interrupt identification, determining whether the sleep identification is set, if yes, resetting the sleep identification, waking up the MCU, enabling the Bluetooth channel, setting the Bluetooth channel connection identification, enabling the interrupt, disabling the USB insert interrupt, exiting the Bluetooth connection interrupt; if no, determining whether the USB channel connection identification is set, if the USB channel connection identification is set, resetting the USB channel connection identification, enabling the Bluetooth channel, setting the Bluetooth channel connection identification, enabling the interrupt, disabling the USB insert interrupt, exiting the Bluetooth connection interrupt; if the USB channel connection identification is not set, enabling the Bluetooth channel, setting the Bluetooth channel connection identification, enabling the interrupt, disabling the USB insert interrupt, exiting the Bluetooth connection interrupt.

When the level of the Bluetooth module state output pin becomes low level, entering the Bluetooth disconnection interrupt further includes:

when the level of the Bluetooth module state output pin becomes low level, entering the Bluetooth disconnection interrupt, disabling the interrupt, clearing the Bluetooth disconnection interrupt identification, disabling the Bluetooth channel, resetting the Bluetooth channel connection identification, enabling the interrupt, wherein enabling the interrupt must secure enabling the USB interrupt, setting the sleep identification, the MCU sleeping, exiting the Bluetooth disconnection interrupt. Above implementing way can realize the present invention as well.

It should be noted that, in the Embodiment 1 of the present invention, Step 110-1 further includes a channel switching instruction, if the instruction is channel switching instruction, disabling the USB channel, enabling the Bluetooth connection interrupt.

Step 110-2 further includes a channel switching instruction, if the instruction is the channel switching instruction, disabling the Bluetooth channel, enabling the USB insert interrupt.

When the USB power delivery pin of the card reader becomes high level, entering the USB insert interrupt specifically includes:

when the USB power delivery pin of the card reader becomes high level, entering the USB insert interrupt, disabling the interrupt, clearing the USB insert interrupt identification, determining whether the sleep identification is set, if the sleep identification is set, resetting the sleep identification, waking up the MCU, enabling the USB channel, setting the USB channel connection identification, enabling the interrupt, disabling the Bluetooth connection interrupt, exiting the USB insert interrupt; if the sleep identification is not set, enabling the USB channel, setting the USB channel connection identification, enabling the interrupt, disabling the Bluetooth connection interrupt, exiting the USB insert interrupt.

When the level of USB power delivery pin of the card reader becomes low level, entering the USB pull-out interrupt specifically includes:

when the level of USB power delivery pin of the card reader becomes low level, entering the USB pull-out interrupt, disabling the interrupt, clearing the USB pull-out interrupt identification, disabling the USB channel, resetting the USB channel connection identification, setting the sleep identification, the MCU sleeping, enabling the interrupt, wherein enabling the interrupt must secure enabling the Bluetooth connection interrupt, exiting the USB pull-out interrupt.

When the level of the Bluetooth module state output pin becomes high level, entering the Bluetooth connection interrupt specifically includes:

when the level of the Bluetooth module state output pin becomes high level, entering the Bluetooth connection interrupt, disabling the interrupt, clearing the Bluetooth connection interrupt identification, determining whether the sleep identification is set, if yes, resetting the sleep identification, waking up the MCU, enabling the Bluetooth channel, setting the Bluetooth channel connection identification, enabling the interrupt, disabling the USB insert interrupt, exiting the Bluetooth connection interrupt; if no, enabling the Bluetooth channel, setting the Bluetooth channel connection identification, enabling the interrupt, disabling the USB insert interrupt, exiting the Bluetooth connection interrupt.

When the level of the Bluetooth module state output pin becomes low level, entering the Bluetooth disconnection interrupt specifically includes:

when the level of the Bluetooth module state output pin becomes low level, entering the Bluetooth disconnection interrupt, disabling the interrupt, clearing the Bluetooth disconnection interrupt identification, disabling the Bluetooth channel, resetting the Bluetooth channel connection identification, setting the sleep identification, the MCU sleeping, enabling the interrupt, wherein enabling the interrupt must secure enabling the USB insert interrupt, exiting the Bluetooth disconnection interrupt. Above implementing way can realize the present invention as well.

In the Embodiment 1 of the present invention, operation of determining whether the work voltage is lower than the preset value can be performed after the system initialization and before receiving the instruction, or can be performed regularly.

It should be noted that the solution of the present invention also is adaptable for contactless card reader. When the contactless card reader switches to sleep state and a card exists, the output impedance of a contactless controller chip is adjusted to a threshold value. When no card exists, a switching field register of the contactless controlling chip is adjusted and contactless field is closed.

Accordingly, when the chip of the contactless card reader determines that capacity value of a specified pin is more than an electric induction threshold value, output high level to a specified interrupt pin of the MCU, trigger external interrupt, wake up the MCU.

When the instruction received by the contactless card reader, of which the value of the first byte is 0X62, perform operation of opening field;

When the instruction received by the contactless card reader, of which the value of the first byte is 0X63, perform operation of closing field.

Embodiment 2:

As shown in FIG. 2-1, the present invention provides a method for a card reader to communicate with an upper computer, which includes:

Step 201, initialize card reader system and enable interrupt;

In Embodiment 2, the system configures a process clock, a timer clock, IO interface, serial interface, USB interface; the card reader enables card insert interrupt and/or card pull-out interrupt and/or USB insert interrupt and/or USB pull-out interrupt and/or Bluetooth connection interrupt and/or Bluetooth disconnection interrupt and/or timer interrupt and/or USB communication interrupt and/or Bluetooth communication interrupt.

As shown in FIG. 2-2, when a card-is-in-slot detecting pin is closed, enter the card insert interrupt, disable the interrupt, clear the interrupt, set the card insert interrupt identification, enabling the interrupt, exit.

As shown in FIG. 2-3, when the card-is-in-slot detecting pin is disconnected, enter the card pull-out interrupt, disable the interrupt, clear the interrupt, set the card pull-out interrupt identification, then enable the interrupt, exit.

Figures 1, 2, 3, 4:
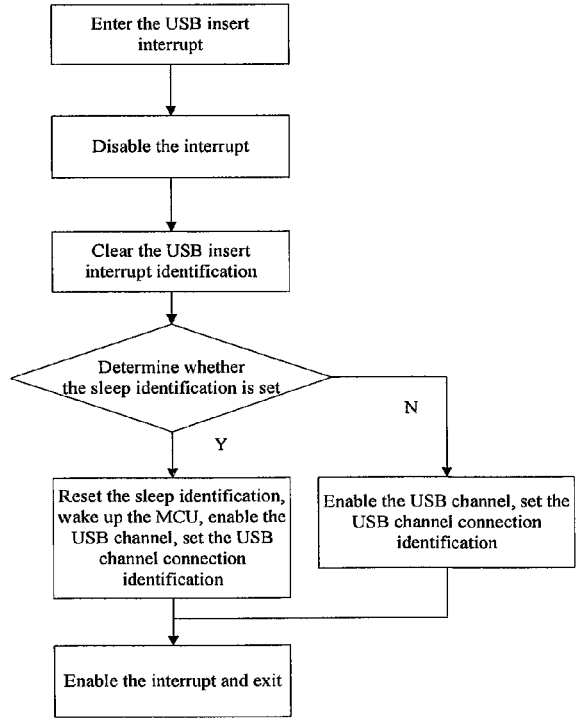
Figures 1, 2, 3, 4, 5:
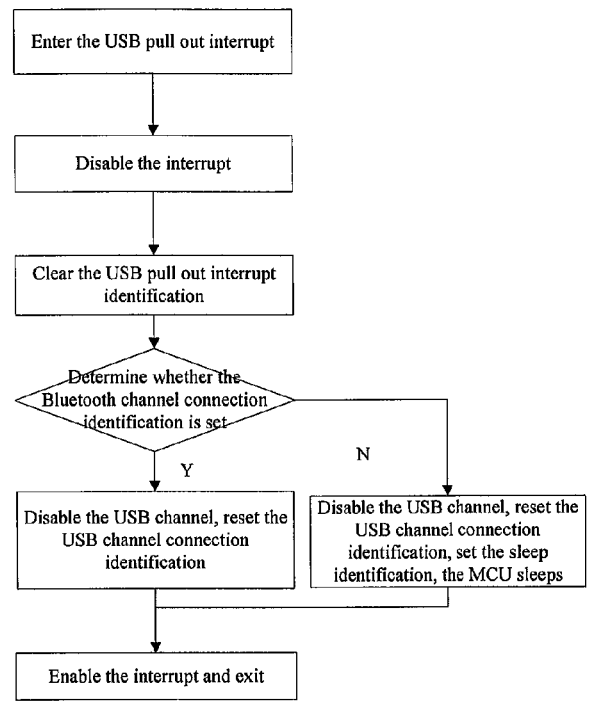
Figures 1, 2, 3, 4, 5, 6:
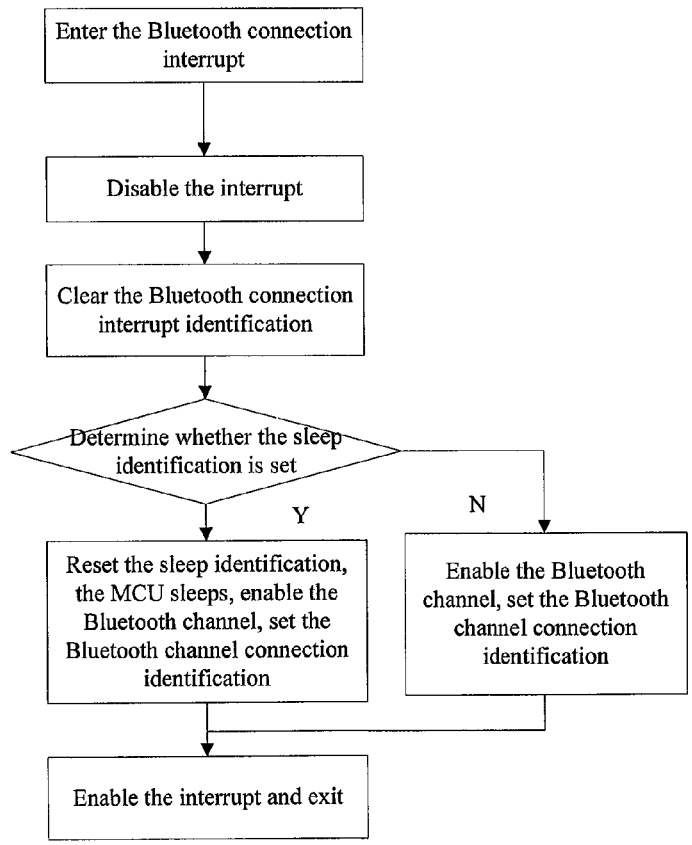
Figures 1, 2, 3, 4, 5, 6, 7:
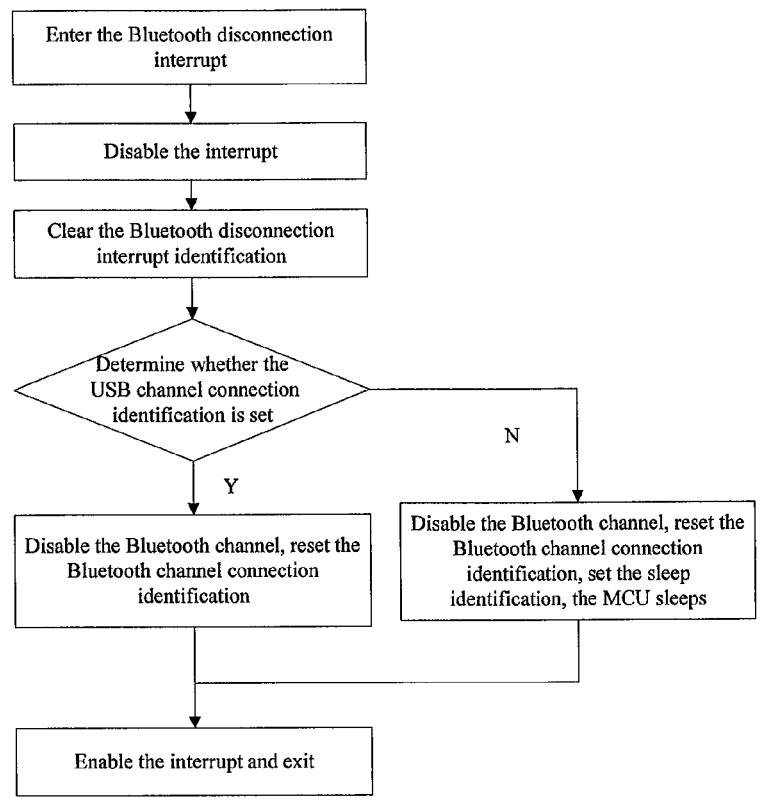
Figures 1, 2, 3, 4, 5, 6, 7, 8:
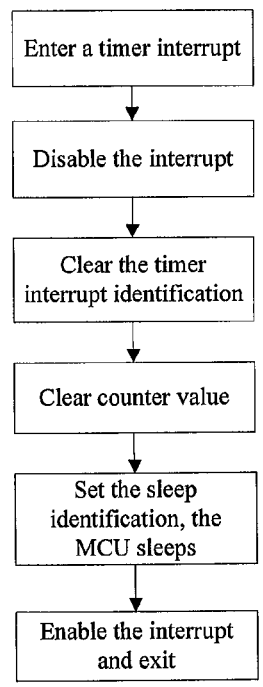
Figures 1, 2, 3, 4, 5, 6, 7, 8, 9:
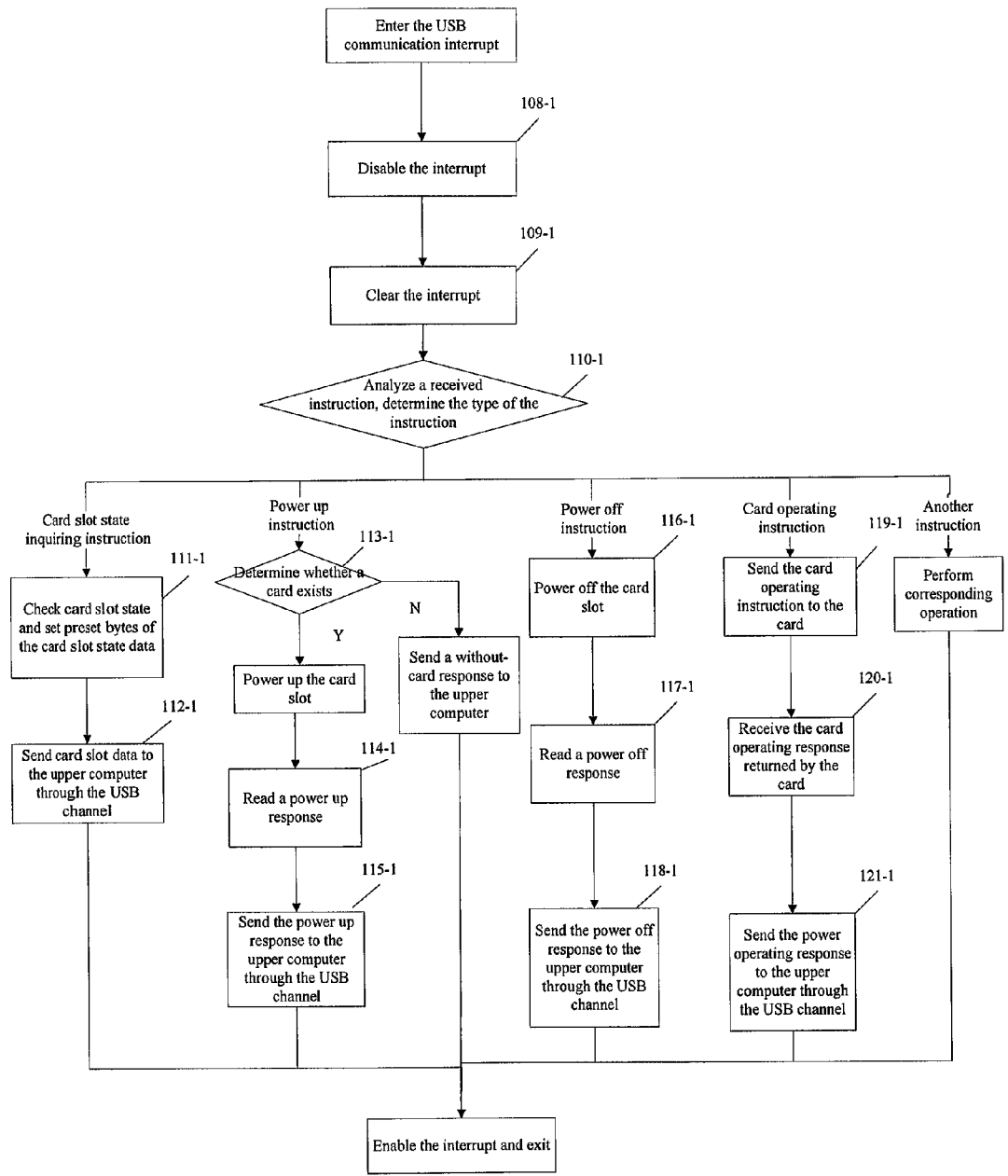
Figures 1, 2, 3, 4, 5, 6, 7, 8, 9, 10:
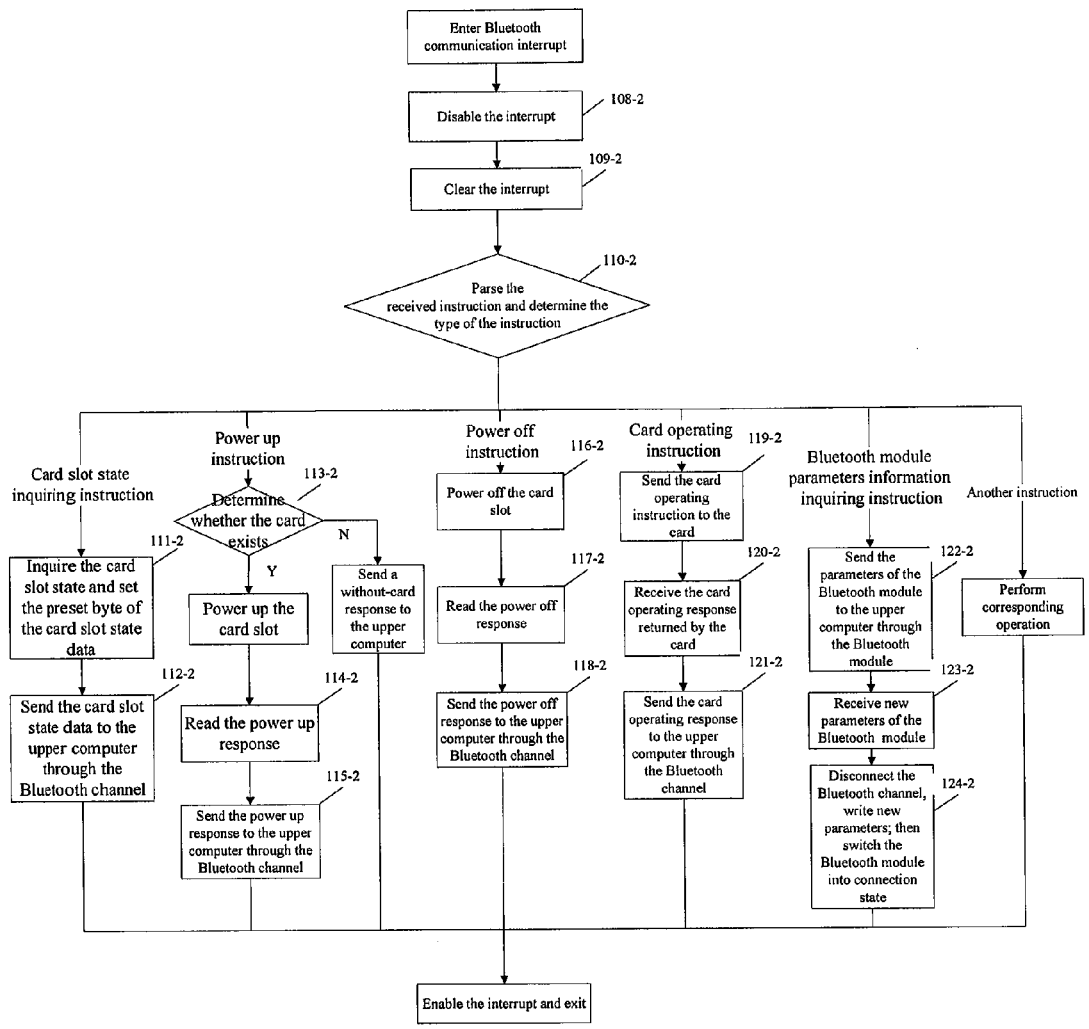
Figures 1, 2:
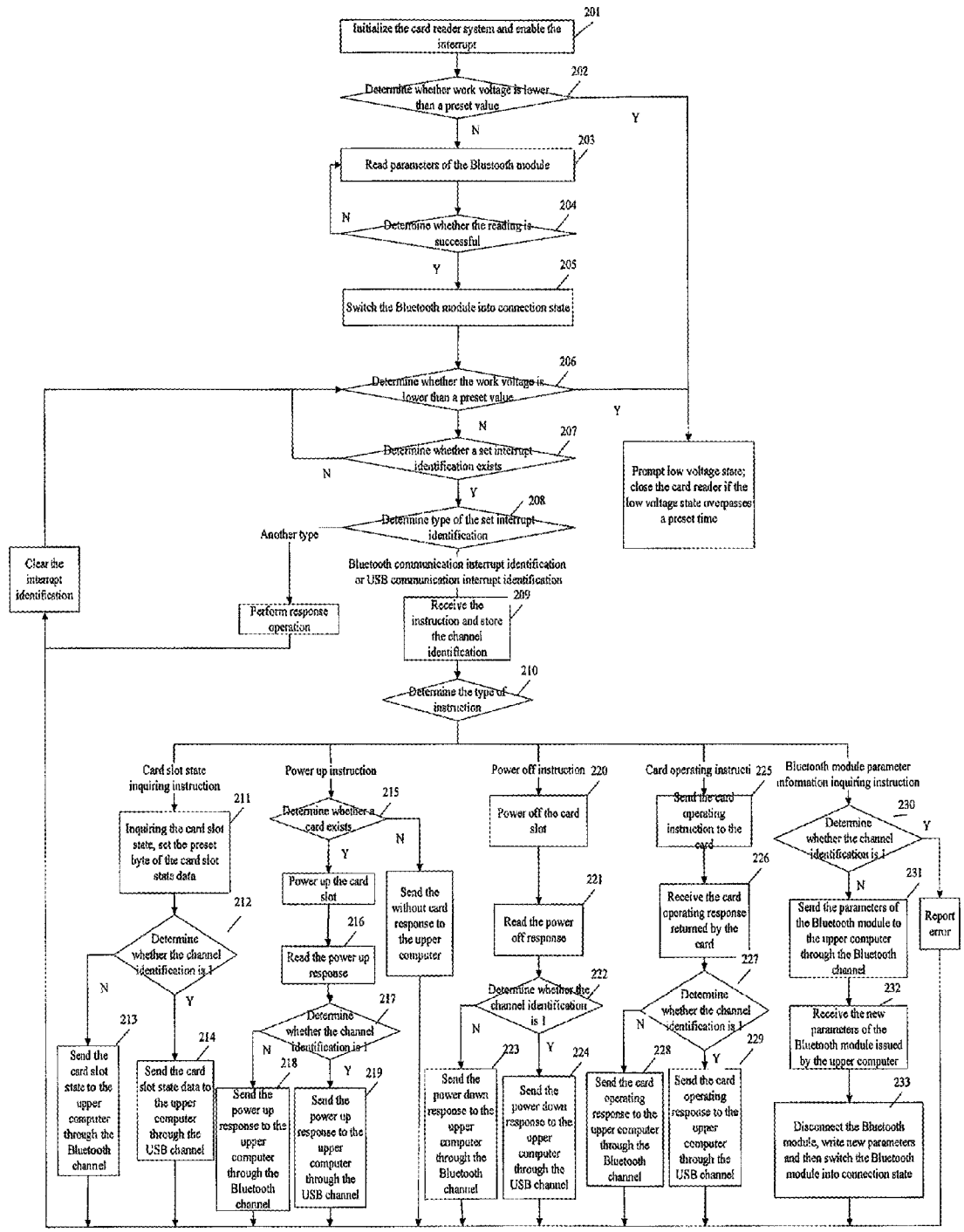
Figures 2, 3:
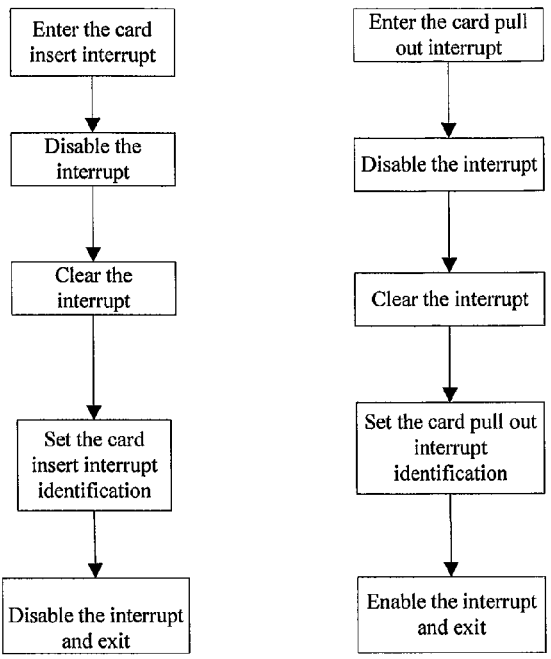
Figures 2, 3, 4, 5:
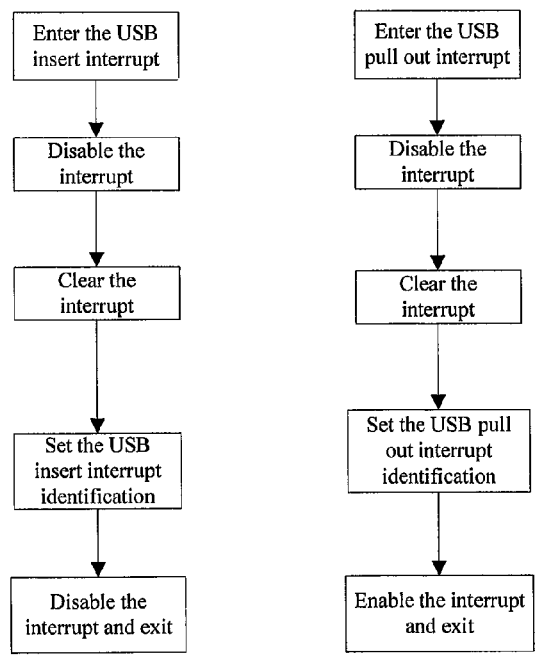

As shown in FIG. 2-4, when the USB power delivery pin is closed, enter the USB insert interrupt, disable the interrupt, clear the interrupt, set the USB insert interrupt identification, enable the interrupt, exit.

As shown in FIG. 2-5, when the USB power delivery pin is disconnected, enter the USB pull-out interrupt, close the interrupt, clear the interrupt, set the USB pull-out interrupt identification, enable the interrupt, exit.

As shown in FIG. 2-6, when the Bluetooth module state output pin is closed, enter the Bluetooth connection interrupt, disable the interrupt, clear the interrupt, set the Bluetooth connection interrupt identification, enable the interrupt, exit.

As shown in FIG. 2-7, when the Bluetooth module state output pin is disconnected, enter the Bluetooth disconnection interrupt, close the interrupt, clear the interrupt, set the Bluetooth disconnection interrupt identification, enable the interrupt, exit.

As shown in FIG. 2-8, when overpassing a preset counter value, enter timer interrupt, close the interrupt, clear the interrupt, clear the counter value, set the timer interrupt identification, enable the interrupt, exit.

As shown in FIG. 2-9, when an instruction is received through the Bluetooth, enter the Bluetooth communication interrupt, disable the interrupt, clear the interrupt, set the Bluetooth communication interrupt identification, enable the interrupt, exit.

As shown in FIG. 2-10, when the instruction is received through USB channel, enter the USB communication interrupt, disable the interrupt, clear the interrupt, set the USB communication interrupt identification, enable the interrupt, exit.

Step 202, determine whether the work voltage is lower than a preset value, if yes, prompt low voltage state, if the low voltage state overpasses a first preset time, close the card reader; if no, go to Step 203.

In Embodiment 2, low work voltage can be prompted by being displayed by a screen or low work voltage can be prompted by changing of color of instructive lamp or low work voltage can be prompted by beeping or low work voltage can be prompted by voice. The first preset time can be 30s.

Step 203, read the parameters of the Bluetooth module;

In Embodiment 2, read content of MAC, PIN and name of the card reader device.

Step 204, determine whether reading is successful;

if yes, go to Step 205; if no, go back to Step 203.

In Embodiment 2, the card reader reads parameters of the Bluetooth module from the Bluetooth module, determines whether the reading is successful upon the last byte of the parameters of the Bluetooth module. If the last byte of the parameters of the Bluetooth module is 0X00, it represents that the card reader reads successfully; otherwise, it represents that the card reader does not read successfully.

Step 205, switch the Bluetooth module into connection state;

Step 206, determine whether the work voltage is lower than a preset value;

if yes, prompt low voltage state, if the low voltage state overpasses the preset time, close the card reader; otherwise, go to Step 207.

Step 207, determine whether a set interrupt identification exists;

if yes, go to Step 208; if no, go back to Step 206.

Step 208, determine the type of the set interrupt identification, if the type is the Bluetooth communication interrupt identification or the USB communication interrupt identification, go to Step 209; if the type is another interrupt identification, perform corresponding operation and clear the interrupt identification.

The another interrupt identification includes card insert interrupt identification, card pull-out interrupt identification, timer interrupt identification, USB insert interrupt identification, Bluetooth connection interrupt identification, Bluetooth disconnection interrupt identification, and USB pull-out interrupt identification;

if the type is the card insert interrupt identification, determine whether the sleep identification is set, if the sleep identification is set, reset the sleep identification, wake up an MCU, set the card slot state identification as with-card identification, determine whether the USB channel connection identification is set, if yes, writing a card insert response to an INT endpoint, clear the interrupt identification, go back to Step 206; if no, clear the interrupt identification, go back to Step 206; if the sleep identification is not set, determine whether the USB channel connection identification is set, if yes, write the card insert response to the INT endpoint, clear the interrupt identification, go back to Step 206; if no, clear the interrupt identification, go back to Step 206; the clearing the interrupt identification specifically is resetting the card insert interrupt identification;

if the type is the card pull-out interrupt identification, set the card slot state as without card identification, determine whether the USB channel connection identification is set, if yes, write a card pull-out response to the INT endpoint, set the sleep identification, the MCU sleeps, clear the interrupt identification, the MCU waits for waking up; if no, set the sleep identification, the MCU sleeps, clear the interrupt identification, the MCU waits for waking up; the clearing the interrupt identification specifically is resetting the card pull-out identification.

If the type is timer interrupt identification, clear the counter value, set the sleep identification, the MCU sleeps, clear the interrupt identification, the MCU waits for waking up; clearing the interrupt identification specifically includes resetting the timer interrupt identification.

If the type is the USB insert interrupt identification, go to Step A;

If the type is the Bluetooth connection interrupt identification, go to Step B;

If the type is the Bluetooth disconnection identification, go to Step C;

If the type is the USB pull-out interrupt connection, go to Step D;

Step A, determine whether the sleep identification is set, if yes, reset the sleep identification, wake up the MCU, enable the USB channel, set the USB channel connection identification, clear the interrupt identification, go back to Step 206; if no, enable the USB channel, set the USB channel connection identification, clear the interrupt identification and go back to Step 206; clearing the interrupt identification specifically is resetting the USB insert interrupt identification;

Step B, determine whether the sleep identification is set, if yes, reset the sleep identification, wake up the MCU, enable the Bluetooth channel, set the Bluetooth channel connection identification, clear the interrupt identification, go back to Step 206; if no, enable the Bluetooth channel connection, set the Bluetooth channel connection identification, clear the interrupt identification, go back to Step 206; in which clearing the interrupt identification specifically is resetting the Bluetooth connection interrupt identification;

Step C, determine whether the USB channel connection identification is set, if yes, disable the Bluetooth channel, reset the Bluetooth channel connection identification, clear the interrupt identification, go back to Step 206; if no, disable the Bluetooth channel, reset the Bluetooth channel connection identification, set the sleep identification, the MCU sleeps, clear the interrupt identification, the MCU waits for waking up; clearing the interrupt identification specifically is resetting the Bluetooth disconnection identification.

Step D, determine whether the Bluetooth channel connection identification is set, if yes, disable the USB channel, reset the USB channel connection identification, clear the interrupt identification, go back to Step 206; if no, disable the USB channel, reset the USB channel connection identification, set the sleep identification, the MCU sleeps, clear the interrupt identification, the MCU waits for waking up; clearing the interrupt identification specifically is resetting the USB interrupt identification.

In Embodiment 2, waking up the MCU specifically includes decreasing frequency dividing value, increasing the frequency of bus clock, restoring the level of kernel voltage of MCU into normal work state, enabling peripherals of a first serial communication interface and a second serial communication interface, the MCU is waken up.

Operation of switching to the sleep state specifically includes increasing frequency dividing value, decreasing the frequency of bus clock, switching the level of kernel voltage of the MCU into state of which the voltage category is 1, disabling the peripherals of the first serial communication interface and the second serial communication interface, and the MCU switches to sleep state.

Step 209, receive the instruction and save channel identification;

In Embodiment 2, when the card reader receives an instruction completing identification, complete the receiving instruction; if the instruction is received through the USB channel, save the channel identification as 1; if the instruction is received through the Bluetooth channel, save the channel identification as 0.

Step 210, determine the type of the instruction;

determine the type of the instruction upon the first byte of the instruction.

If the first byte of the instruction is 0X65, the type is a checking card slot state instruction, go to Step 211;

If the first byte of the instruction is 0X62, the type is a power-up instruction, go to Step 215;

If the first byte of the instruction is 0X63, the type is a power-off instruction, go to Step 220;

If the first byte of the instruction is 0X6f, the type is a card operating instruction, go to Step 225;

If the first byte of the instruction is 0X5A and the fourth byte is 0X61, the instruction is Bluetooth module parameter information inquiring instruction, go to Step 230.

Step 211, inquire the card slot state and set the preset byte of the card slot state data;

In Embodiment 2, determine the card slot state upon the state of the IO interface.

If the IO interface is high level, it represents without-card state and the preset byte of the card slot state data is set as 0X02;

If the IO interface is low level and a specified identification flag is 0, it represents that the card is in the slot and activated, the preset byte of the card slot state data is set as 0X00;

If the IO interface is low level and the specified identification flag is 1, it represents that the card is in the slot and inactivated, the preset byte of the card slot state data is set as 0X01.

The preset byte of the card slot state data can be the eighth byte.

Step 212, determine whether the channel identification is 1;

if yes, go to Step 214; if no, go to Step 213.

Step 213, send the card slot state data to the upper computer through the Bluetooth channel, then clear the interrupt identification and then go back to Step 206;

In Embodiment 2, clearing the interrupt identification specifically includes resetting the Bluetooth communication interrupt identification.

Step 214, send the card slot state data to the upper computer through the USB channel, then clear the interrupt identification and go back to the Step 206;

In Embodiment 2, clearing the interrupt identification specifically includes resetting the USB communication interrupt identification.

Step 215, determine whether a card is in the slot, if yes, power-up the card slot and then go to Step 216; if no, send a no-card-is-in-slot response to the upper computer and then clear the interrupt identification, go back to Step 206;

In Embodiment 2, inquire the card slot state identification, if the identification is with-card identification, it represents that a card exists; otherwise, no card exists;

Step 216, read a power-up response;

In Embodiment 2, reading the power-up response containing card information, for example, 800c00000000120000003bf095000081b1fe9a1f0729;

Step 217, determine whether the channel identification is 1;

If yes, go to Step 219; if no, go to Step 218.

Step 218, send the power-up response to the upper computer through the Bluetooth channel, then clear the interrupt identification and go back to Step 206;

In Embodiment 2, clearing the interrupt identification specifically is resetting the Bluetooth communication interrupt identification.

Step 219, send the power-up response to the upper computer through the USB channel, then clear the interrupt identification and go back to Step 206;

In Embodiment 2, clearing the interrupt identification specifically is resetting the USB communication interrupt identification.

Step 220, power-off the card slot;

Step 221, read the power-off response;

In Embodiment 2, the first byte of the power-off response is 0X81, for example, 81000000000004010000.

Step 222, determine whether the channel identification is 1;

if yes, go to Step 224; if no, go to Step 223.

Step 223, send the power-off response to the upper computer through the Bluetooth channel, then clear the interrupt identification and go back to Step 206;

In Embodiment 2, clearing the interrupt identification specifically is resetting the Bluetooth communication interrupt identification.

Step 224, send the power-off response to the upper computer through the USB channel, then clear the interrupt identification and go back to Step 206;

In Embodiment 2, clearing the interrupt identification is resetting the USB communication interrupt identification.

Step 225, send the card operating instruction to the card;

In Embodiment 2, the card reader does no process on the received card operating instruction and sends the card operating instruction to the card directly.

Step 226, receive the card operating response returned from the card;

In Embodiment 2, the card operating instruction, of which the first byte is 0X80, returned from the card is received. For example, 8005000000001800000000e101f010;

Step 227, determine whether the channel identification is 1;

If yes, go to Step 228; if no, go to Step 225.

Step 228, send the card operating response to the upper computer through the Bluetooth channel, then clear the interrupt identification and go back to Step 206;

In Embodiment 2, clearing the interrupt identification specifically is resetting the Bluetooth communication interrupt.

Step 229, send the card operating response to the upper computer through the USB channel, then clear the interrupt identification and go back to Step 206;

In Embodiment 2, clearing the interrupt identification specifically is resetting the USB channel interrupt identification.

Step 230, determine whether the channel identification is 1;

if yes, report error, then clear the interrupt identification, if no, go to Step 234.

In Embodiment 2, clearing the interrupt identification specifically is resetting the USB communication interrupt identification.

Step 231, send the parameters of the Bluetooth module to the upper computer through the Bluetooth channel;

In Embodiment 2, specifically, the parameters containing MAC content, the card reader device name and the PIN, of which the first byte is 0XA5, the fourth byte is 0X62, of the Bluetooth module are sent to the upper computer.

Step 232, receive new parameters of the Bluetooth module issued by the upper computer;

Step 233, disconnect the Bluetooth module, write new parameters, then switch the Bluetooth module into connection state, clear the interrupt identification, and then go back to Step 206;

In Embodiment 2, clearing the interrupt identification specifically is resetting the Bluetooth communication interrupt identification.

It should be noted that, in Embodiment 2, between Step 206 and Step 207, the method further includes detecting the connection way between the card reader and the upper computer;

if the card reader connects to the upper computer through the USB interface, the card reader sets the USB channel connection identification, disable the Bluetooth channel, go to Step 207; if the card reader connects to the upper computer through the Bluetooth module, set the Bluetooth channel connection identification, disable the USB channel, go to Step 207;

Correspondingly, Step A to Step D in Step 208 can be Step A-1 to Step D-1,

Step A-1, if the type is USB insert interrupt identification, determine whether the sleep identification is set, if the sleep identification is set, reset the sleep identification, wake up the MCU, enable the USB channel, set the USB channel connection identification, disable the Bluetooth connection interrupt, determine whether the Bluetooth channel connection identification is set, if the Bluetooth channel connection identification is set, reset the Bluetooth channel connection identification, clear the interrupt identification, go back to Step 206; if the Bluetooth connection identification is not set, clear the interrupt identification, go back to Step 206; and if the sleep identification is not set, determine whether the Bluetooth channel connection identification is set, if yes, reset the Bluetooth channel connection identification, disable the Bluetooth connection interrupt, enable the USB channel, set the USB channel connection identification, clear the interrupt identification, go back to Step 206; if no, disable the Bluetooth connection interrupt, enable the USB channel, set the USB channel connection identification, clear the interrupt identification, go back to Step 206; in which clearing the interrupt identification is resetting the USB insert interrupt identification;

Step B-1, determine whether the sleep identification is set, if yes, reset the sleep identification, wake up the MCU, enable the Bluetooth channel, set the Bluetooth channel connection identification, reset the Bluetooth connection interrupt identification, go back to Step 206; if no, enable the Bluetooth channel, set the Bluetooth channel connection identification, reset the Bluetooth connection interrupt identification, go back to Step 206;

Step C-1, disable the Bluetooth channel, reset the Bluetooth channel connection identification, set the sleep identification, the MCU sleeps, clear the interrupt identification;

clearing the interrupt identification specifically is resetting the Bluetooth disconnection interrupt identification.

Step D-1, disable the USB channel, reset the USB channel connection identification, enable the Bluetooth connection interrupt, clear the interrupt identification, set the sleep identification, the MCU sleeps.

It should be noted that, in Embodiment 2, between Step 206 to Step 207, the method further includes detecting the connection way between the card reader and the upper computer;

if the card reader connects to the upper computer through the Bluetooth module, the card reader sets the Bluetooth channel connection identification, disable the USB channel, go to Step 207; if the card reader connects to the upper computer through the USB interface, set the USB channel connection identification, disable the Bluetooth channel connection, go to Step 207. Correspondingly, the Step A to Step D in Step 208 may be Step A-2 to Step D-2 as well.

Step A-2, determine whether the sleep identification is set, if yes, set the sleep identification, wake up the MCU, enable the USB channel, set the USB channel connection identification, clear the interrupt identification, go back to Step 206; if no, enable the USB channel, set the USB channel connection identification, clear the interrupt identification, go back to Step 206; in which clearing the interrupt identification specifically is resetting the USB insert interrupt identification.

Step B-2, determine whether the sleep identification is set, if yes, reset the sleep identification, wake up the MCU, enable the Bluetooth channel, set the Bluetooth channel connection identification, disable the USB insert interrupt, clear the interrupt identification, go back to Step 206; if no, determine whether the USB channel connection identification is set, if the USB channel connection identification is set, reset the USB channel connection identification, enable the Bluetooth channel, set the Bluetooth channel connection identification, disable the USB insert interrupt, clear the interrupt identification, go back to Step 206; if the USB channel connection identification is not set, enable the Bluetooth channel, set the Bluetooth channel connection identification, disable the USB insert interrupt, clear the interrupt identification, go back to Step 206; in which clearing the interrupt identification specifically is resetting the Bluetooth connection interrupt identification;

Step C-2, disable the Bluetooth channel, reset the Bluetooth channel connection identification, enable the USB insert interrupt, clear the interrupt identification, set the sleep identification, the MCU sleeps; clearing the interrupt identification specifically is resetting the Bluetooth disconnection interrupt identification.

Step D-2, reset the USB channel connection identification, set the sleep identification, clear the interrupt identification, the MCU sleeps; clearing the interrupt identification specifically is resetting the USB pull-out interrupt identification.

It should be noted that, in Embodiment 2, Step A to Step D in Step 208 can also be Step A-3 to Step D-3.

Step A-3, determine whether the sleep identification is set, if the sleep identification is set, reset the sleep identification, wake up the MCU, enable the USB channel, set the USB channel connection identification, disable the Bluetooth connection interrupt, clear the interrupt identification, go back to Step 206; if the sleep identification is not set, enable the USB channel, set the USB channel connection identification, disable the Bluetooth connection interrupt, clear the interrupt identification, go back to Step 206; clearing the interrupt identification specifically is resetting the USB insert interrupt identification;

Step B-3, determine whether the sleep identification is set, if yes, reset the sleep identification, wake up the MCU, enable the Bluetooth channel, set the Bluetooth channel connection identification, disable the USB insert interrupt, clear the interrupt identification, go back to Step 206; if no, enable the Bluetooth channel, set the Bluetooth channel connection identification, disable the USB insert interrupt, clear the interrupt identification, go back to Step 206; in which clearing the interrupt identification specifically is resetting the Bluetooth connection interrupt identification;

Step C-3, enable the Bluetooth channel, reset the Bluetooth channel connection identification, enable the USB insert interrupt, clear the interrupt identification, set the sleep identification, the MCU sleeps; clearing the interrupt identification specifically is resetting the Bluetooth disconnection interrupt identification;

Step D-3, disable the USB channel, resetting the USB channel connection identification, enable the Bluetooth connection interrupt, clear the interrupt identification, set the sleep identification, the MCU sleeps; clearing the interrupt identification is resetting the USB pull-out interrupt identification.

What are described above is only specifically preferable embodiments of the present invention. However, the scope of protection of the present invention is not limited to the embodiments of the present invention, any change or substitution which is easily thought of should fall in the scope of protection of the present invention. Therefore, the scope of protection of the present invention should be defined by the appended claims.

The invention claimed is:

1. A method for a card reader to communicate with an upper computer, comprises:

Step A, initializing a card reader system, enabling card insert interrupt, card pull-out interrupt, USB insert interrupt, USB pull-out interrupt, Bluetooth connection interrupt, Bluetooth disconnection interrupt, USB communication interrupt, and/or Bluetooth communication interrupt;

Step B, determining whether work voltage is lower than a preset value, if yes, prompting a low work voltage state, if the low work voltage state overpasses a first preset time, closing the card reader; otherwise, going back to Step B;

in which the above procedure further comprises:

when receiving a USB communication interrupt signal, the card reader entering the USB communication interrupt, receiving an instruction through USB channel, performing corresponding operation upon the received instruction, and returning operation result to the upper computer through the USB channel;

when receiving a Bluetooth communication interrupt signal, the card reader entering the Bluetooth communication interrupt, receiving an instruction through Bluetooth channel, performing corresponding operation upon the received instruction, and returning operation result to the upper computer through the Bluetooth channel;

when receiving a USB insert interrupt signal, the card reader entering the USB insert interrupt, and setting a USB channel connection identification;

when receiving a USB pull-out interrupt signal, the card reader entering the USB pull-out interrupt, and resetting the USB channel connection identification;

when receiving a Bluetooth connection interrupt signal, the card reader entering the Bluetooth connection interrupt, and setting a Bluetooth channel connection interrupt identification;

when receiving a Bluetooth disconnection interrupt signal, the card reader entering the Bluetooth disconnection interrupt, and resetting the Bluetooth channel connection identification;

when receiving a card insert interrupt signal, the card reader entering the card insert interrupt, and setting a card slot state identification as with-card identification; and/or when receiving a card pull-out interrupt signal, the card reader entering card pull-out interrupt, and setting the card slot state identification as without-card identification.

2. The method of claim 1, wherein, between Step A and Step B, the method further comprises:

Step B1, reading parameters of a Bluetooth module, determining whether the reading is successful, if yes, switching the Bluetooth module into connection state and performing Step B; if no, setting a USB channel identification and performing Step B; or Step B2, reading parameters of the Bluetooth module, determining whether the reading is successful, if yes, switching the Bluetooth module into connection state and performing Step B; if no, going back to Step B2.

3. The method of claim 2, wherein the entering USB insert interrupt and setting a USB channel connection identification, specifically comprises:

entering the USB insert interrupt, determining whether a sleep identification is set, if yes, resetting the sleep identification, waking up the MCU, enabling USB channel, setting the USB channel connection identification, then exiting the USB insert interrupt; if no, enabling the USB channel, setting the USB channel connection identification, then exiting the USB insert interrupt;

entering the USB pull-out interrupt and resetting the USB channel connection identification specifically comprises:

entering the USB pull-out interrupt, determining whether the Bluetooth channel connection identification is set, if yes, disabling the USB channel, resetting the USB channel connection identification, then exiting the USB pull-out interrupt; if no, disabling the USB channel, resetting the USB channel connection identification, setting the sleep identification, sleeping by the MCU, then exiting the USB pull-out interrupt;

the entering the Bluetooth connection interrupt and setting a Bluetooth channel connection interrupt identification specifically comprises:

entering the Bluetooth connection interrupt, determining whether the sleep identification is set, if yes, resetting the sleep identification, waking up the MCU, enabling Bluetooth channel, setting the Bluetooth channel connection identification, then exiting the Bluetooth connection interrupt; and the entering Bluetooth disconnection interrupt and resetting the Bluetooth channel connection identification specifically comprises:

entering the Bluetooth disconnection interrupt, determining whether the USB channel connection identification is set, if yes, disabling the Bluetooth channel, resetting the Bluetooth channel connection identification, then exiting the Bluetooth disconnection interrupt; if no, disabling the Bluetooth channel, resetting the Bluetooth channel connection identification, setting the sleep identification, sleeping by the MCU, then existing the Bluetooth disconnection interrupt.

4. The method of claim 2, wherein when the determination result in Step B is no, before going back to Step B, the method further comprises Step C, Step C: detecting a connection way between the card reader and the upper computer;

setting, by the card reader, the USB channel connection identification and going back to Step B if the card reader connects to the upper computer through USB interface; while setting the Bluetooth channel connection identification and going back to Step B if the card reader connects to the upper computer through the Bluetooth module;

the entering the USB insert interrupt and setting the USB channel connection identification specifically comprises:

entering USB insert interrupt, determining whether the sleep identification is set, if yes, resetting the sleep identification, waking up the MCU, enabling USB channel, setting the USB channel connection identification, disabling Bluetooth connection interrupt, determining whether the Bluetooth channel connection identification is set, if yes, resetting the Bluetooth channel connection identification and exiting the USB insert interrupt; if the Bluetooth channel connection identification is not set, then exiting the USB insert interrupt;

if the sleep identification is not set, determining whether the Bluetooth channel connection identification is set, if yes, resetting the Bluetooth channel connection identification, disabling the Bluetooth connection interrupt, enabling the USB channel, setting the USB channel connection identification, then exiting the USB insert interrupt; if no, disabling the Bluetooth connection, enabling the USB channel, resetting the USB channel connection identification, then exiting the USB insert interrupt;

the entering the USB pull-out interrupt and resetting the USB channel connection identification specifically comprises:

entering the USB disconnection interrupt, disabling the USB channel, resetting the USB channel connection identification, enabling the Bluetooth connection interrupt, setting the sleep identification, sleeping by the MCU, then exiting the USB pull-out interrupt;

the entering the Bluetooth connection interrupt and setting the Bluetooth channel connection identification specifically comprises:

entering the Bluetooth connection interrupt, determining whether the sleep identification is set, if yes, resetting the sleep identification, waking up the MCU, enabling the Bluetooth channel, setting the Bluetooth channel connection interrupt, then exiting the Bluetooth connection interrupt; if no, enabling the Bluetooth channel, setting the Bluetooth channel connection identification and exiting the Bluetooth connection interrupt;

the entering the Bluetooth disconnection interrupt and resetting the Bluetooth channel connection identification specifically comprises:

entering the Bluetooth disconnection interrupt, disabling the Bluetooth channel, resetting the Bluetooth channel connection identification, setting the sleep identification, sleeping by the MCU, then exiting the Bluetooth disconnection interrupt.

5. The method of claim 2, wherein when the determination result in Step B is no, before going back to Step B, the method further comprises Step C', Step C': detecting a connection way between the card reader and the upper computer;

setting, by the card reader, the Bluetooth connection identification and going back to Step B if the card reader is connected to the upper computer through the Bluetooth module; while setting the USB channel connection identification and going back to Step B if the card reader is connected to the upper computer through the USB interface;

the entering USB insert interrupt and setting the USB channel connection identification specifically comprises:

entering the USB insert interrupt, determining whether the sleep identification is set, if yes, resetting the sleep identification, waking up the MCU, enabling the USB channel, setting the USB channel connection identification and exiting the USB insert interrupt; if no, enabling the USB channel, setting the USB channel connection identification and exiting the USB insert interrupt;

the entering the USB pull-out interrupt and resetting the USB channel connection identification specifically comprises:

entering the USB pull-out interrupt, disabling the USB channel, resetting the USB channel connection identification, setting the sleep identification, sleeping by the MCU, then exiting the USB pull-out interrupt;

the entering the Bluetooth connection interrupt and setting the Bluetooth channel connection identification specifically comprises:

entering the Bluetooth connection interrupt, determining whether the sleep identification is set, if yes, resetting the sleep identification, waking up the MCU, enabling the Bluetooth channel, setting the Bluetooth channel connection identification, disabling the USB insert interrupt, then exiting the Bluetooth connection interrupt; if no, determining whether the USB channel connection identification is set, if yes, resetting the USB channel connection identification, enabling the Bluetooth channel, setting the Bluetooth channel connection identification, disabling the USB insert interrupt, then exiting the Bluetooth connection interrupt; if no, enabling the Bluetooth channel, setting the Bluetooth channel connection identification, disabling the USB insert interrupt, then exiting the Bluetooth connection interrupt;

the entering the Bluetooth disconnection interrupt and resetting the Bluetooth channel connection identification specifically comprises:

entering the Bluetooth disconnection interrupt, disabling the Bluetooth channel, resetting the Bluetooth channel connection identification, enabling the USB insert interrupt, setting the sleep identification, sleeping by the MCU, then exiting the Bluetooth disconnection interrupt.

6. The method of claim 2, wherein, the entering the USB insert interrupt and setting the USB channel connection identification specifically comprises:

entering the USB insert interrupt, determining whether the sleep identification is set, if yes, resetting the sleep identification, waking up the MCU, enabling the USB channel, setting the USB channel connection identification, disabling the Bluetooth connection interrupt, then exiting the USB insert interrupt; if no, enabling the USB channel, setting the USB channel connection identification, disabling the Bluetooth connection interrupt, then exiting the USB insert interrupt;

the entering the USB pull-out interrupt and resetting the USB channel connection identification specifically comprises:

entering the USB pull-out interrupt, disabling the USB channel, resetting the USB channel connection identification, enabling the Bluetooth connection interrupt, setting the sleep identification, sleeping by the MCU, then exiting the USB pull-out interrupt;

the entering the Bluetooth connection interrupt and setting the Bluetooth channel connection identification specifically comprises:

entering the Bluetooth connection interrupt, determining whether the sleep identification is set, if yes, resetting the sleep identification, waking up the MCU, enabling the Bluetooth channel, setting the Bluetooth channel connection identification, disabling the USB insert interrupt, then exiting the Bluetooth connection interrupt; if no, enabling the Bluetooth channel, setting the Bluetooth channel connection identification, disabling the USB insert interrupt, then exiting the Bluetooth connection interrupt;

the entering the Bluetooth disconnection interrupt and resetting the Bluetooth channel connection identification specifically comprises:

entering the Bluetooth disconnection interrupt, disabling the Bluetooth channel, resetting the Bluetooth channel connection identification, enabling the USB insert interrupt, setting the sleep identification, sleeping by the MCU, then exiting the Bluetooth disconnection interrupt.

7. The method of claims 3, wherein the entering the card insert interrupt and setting the card slot state identification as with-card identification specifically comprises:

entering the card insert interrupt, determining whether the sleep identification is set, if yes, resetting the sleep identification, waking up the MCU, setting the card slot state identification as with-card identification, determining whether the USB channel connection identification is set, if yes, writing a card insert response to the INT endpoint, exiting the card insert interrupt; if no, exiting the card insert interrupt; if the sleep identification is not set, setting the card slot state identification as with-card identification, determining whether the USB channel connection identification is set, if yes, writing the card insert response to the INT endpoint, exiting the card insert interrupt; if no, exiting the card insert interrupt;

the entering the card pull-out interrupt and setting the card slot state identification as without-card identification specifically comprises:

entering the card pull-out interrupt, setting the card slot state identification as without-card identification, determining whether the USB channel connection identification is set, if yes, writing the card pull-out response to the INT endpoint, setting the sleep identification, sleeping by the MCU, then exiting the card pull-out interrupt; if no, setting the sleep identification, sleeping by the MCU, then exiting the card pull-out interrupt;

Step A further comprises enabling a timer interrupt, when the card reader receives a timer interrupt signal, entering the timer interrupt, clearing a counter value, setting the sleep identification, sleeping by the MCU, then exiting the timer interrupt.

8. The method of claims 3, wherein
the entering the USB communication interrupt, receiving the instruction through the USB channel, performing corresponding operation upon the received instruction, and returning operation result to the upper computer through the USB channel, specifically comprises:
entering the USB communication interrupt, receiving the instruction through the USB channel, parsing the received instruction, determining a type of the instruction, if the type is card slot state inquiring instruction, inquiring, by the card reader, the card slot state, setting preset bytes of card slot state data, returning the set card slot data to the upper computer through the USB channel; if the type is power-up instruction, powering, by the card reader, up the card slot, reading a power-up response, returning the power-up response to the upper computer through the USB channel; if the type is power-off instruction, powering, by the card reader, off the card slot, reading a power-off response, returning the power-off response to the upper computer through the USB channel; if the type is card operating instruction, sending, by the card reader, the card operating instruction to the card, receiving a card operating response returned from the card, returning the card operating response to the upper computer through the USB channel; and if the type is another instruction, performing corresponding operation;
entering the Bluetooth communication interrupt, receiving the instruction through the Bluetooth channel, performing corresponding operation upon the received instruction and returning operation result to the upper computer through the Bluetooth channel, specifically comprises:
entering the Bluetooth communication interrupt, receiving the instruction through the Bluetooth channel, parsing the received instruction, determining a type of the instruction, if the type is card slot state inquiring instruction, inquiring, by the card reader, the card slot state, setting the preset bytes of the card slot state data, returning the set card slot data to the upper computer through the Bluetooth channel; if the type is power-up instruction, powering, by the card reader, up the card slot, reading the power-up response, returning the power-up response to the upper computer through the Bluetooth channel; if the type is the power-off instruction, powering, by the card reader, off the card slot, reading the power-off response, returning the power-off response to the upper computer through the Bluetooth channel; if the type is card operating instruction, sending, by the card reader, the card operating instruction to the card, receiving the card operating response returned from the card, returning the card operating response to the upper computer through the Bluetooth channel; if the type is Bluetooth module parameter information inquiring instruction, sending, by the card reader, the parameters of the Bluetooth module to the upper computer through the Bluetooth channel, waiting for new parameters of the Bluetooth module issued from the upper computer, disconnecting the connection of the Bluetooth module after receiving the new parameters, writing the new parameters, and switching the Bluetooth module into connecting state; and if the type is another instruction, performing corresponding operation.

9. The method of claim 6, wherein
the entering the USB communication interrupt, receiving the instruction through the USB channel, performing corresponding operation upon the received instruction, and returning the operating result to the upper computer through the USB channel, specifically comprises:
entering the USB communication interrupt, receiving the instruction through the USB channel, parsing the received instruction, determining a type of the instruction, if the type is a channel switching instruction, enabling the Bluetooth connection interrupt;
the entering the Bluetooth communication interrupt, receiving the instruction through the Bluetooth channel, performing corresponding operation upon the received instruction, and returning the operation result to the upper computer through the Bluetooth channel, specifically comprises:
entering the Bluetooth communication interrupt, receiving the instruction through the Bluetooth channel, parsing the received instruction, determining a type of the instruction, if the type is a channel switching instruction, enabling the USB insert interrupt; and if the type is another instruction, performing corresponding operation.

10. The method of claim 2, wherein
the parameters of the Bluetooth module specifically comprises: content of MAC, PIN and name of the card reader device;
the determining whether the reading is successful, specifically comprises, determining, by the card reader, whether reading is successful upon the preset bytes in the parameters of the Bluetooth module, determining that the reading is successful if the value of the preset bytes in the parameters of the Bluetooth module equals the preset bytes; and determining that the reading is not successful if the value of the preset bytes in the parameters of the Bluetooth module does not equal the preset bytes.

11. The method of claim 7, wherein sleeping by the MCU specifically comprises:
increasing frequency dividing value, decreasing the frequency of bus clock, switching the level of kernel voltage of MCU into state of which the voltage category is 1, disabling peripherals of a first serial communication interface and a second serial communication interface, and sleeping by the MCU.

12. A method for a card reader to communicate with an upper computer, comprises:
Step S1, initializing a card reader system, enabling card insert interrupt, card pull-out interrupt, USB insert interrupt, USB pull-out interrupt, Bluetooth connection interrupt, Bluetooth disconnection interrupt, timer interrupt, USB communication interrupt, and/or Bluetooth communication interrupt;
Step S2, determining whether a work voltage is lower than a preset value, if yes, prompting low power state, when the low power state overpasses a first preset time, closing the card reader; if no, going to Step S3;
Step S3, determining whether a set interrupt identification exists, if yes, going to Step S4; otherwise, going back to Step S2;
the interrupt identification comprising card insert interrupt identification, card pull-out interrupt identification, USB insert interrupt identification, USB pull-out interrupt identification, Bluetooth connection interrupt identification, Bluetooth disconnection interrupt identification, Bluetooth communication interrupt identification, USB communication interrupt identification, and timer interrupt identification;

Step S4, detecting a type of the set interrupt identification; if the type is the Bluetooth communication interrupt identification or the USB communication interrupt identification, going to Step S5; if the type is another interrupt identification, performing corresponding operation upon the type of the set interrupt identification, going back to Step S2;

Step S5, receiving an instruction and saving a channel identification corresponding to the instruction, performing corresponding operation upon the type of the instruction, sending corresponding response to the upper computer, clearing the corresponding interrupt identification, then going back to Step S2.

13. The method of claim 12, wherein when the card reader receives a card insert interrupt signal, the card reader sets the card insert interrupt identification;

when the card reader receives a card pull-out interrupt signal, the card reader sets the card pull-out interrupt identification;

when the card reader receives a USB insert interrupt signal, the card reader sets the USB insert interrupt identification;

when the card reader receives a USB pull-out interrupt signal, the card reader sets the USB pull-out interrupt identification;

when the card reader receives a Bluetooth connection interrupt signal, the card reader sets the Bluetooth connection interrupt identification;

when the card reader receives a Bluetooth disconnection signal, the card reader sets the Bluetooth disconnection interrupt identification;

when the card reader receives a Bluetooth communication interrupt signal, the card reader sets the Bluetooth communication interrupt identification; and when the card reader receives a USB communication interrupt signal, the card reader sets the USB communication interrupt identification.

14. The method of claim 12, wherein between Step S2 and Step S3, the method comprises:

Step S2', reading the parameters of the Bluetooth module, determining whether the reading is successful, if yes, switching the Bluetooth module into connection state, going to StepS3; if no, setting a USB channel identification, then going to Step S2; or StepS2", reading the parameters of the Bluetooth module, determining whether the reading is successful, if yes, switching the Bluetooth module into connection state, going to StepS3; if no, going back to StepS2".

15. The method of claim 14, wherein if the type is another interrupt identification, performing corresponding operation upon the type of the set interrupt identification, then going back to Step S2, specifically comprises:

if the set interrupt identification is that the USB insert interrupt identification is set, determining whether a sleep identification is set, if yes, resetting the sleep identification, waking up MCU, enabling USB channel, setting the USB channel connection identification, resetting the USB insert interrupt identification, going back to Step S2; if no, enabling the USB channel, setting the USB channel connection identification, resetting the USB insert interrupt identification, then going back to Step S2;

if the set interrupt identification is that the USB pull-out interrupt identification is set, determining whether a Bluetooth connection identification is set, if yes, disabling the USB channel, resetting the USB channel connection identification, resetting the USB pull-out identification, going back to Step S2; if no, disabling the USB channel, resetting the USB channel connection identification, resetting the USB pull-out interrupt identification, setting the sleep identification, then sleeping by the MCU;

if the set interrupt identification is that the Bluetooth connection interrupt identification is set, determining whether the sleep identification is set, if yes, resetting the sleep identification, waking up the MCU, enabling the Bluetooth channel, setting the Bluetooth channel connection identification, resetting the Bluetooth connection interrupt identification, going back to Step S2; if no, enabling the Bluetooth channel, setting the Bluetooth channel connection identification, resetting the Bluetooth connection interrupt identification, then going back to Step S2;

if the set interrupt identification is that the Bluetooth disconnection interrupt identification is set, determining whether the USB channel connection identification is set, if yes, disabling the Bluetooth channel, resetting the Bluetooth channel connection identification, resetting the Bluetooth channel disconnection identification, going back to StepS2; if no, disabling the Bluetooth channel, resetting the Bluetooth channel connection identification, resetting the Bluetooth disconnection interrupt identification, setting the sleep identification, then sleeping by the MCU.

16. The method of claim 14, wherein between Step S2' and Step S3, or between Step S2" and Step S3, the method comprises Step S3', Step S3', detecting a connection way between the card reader and the upper computer;

if the card reader connects to the upper computer through the USB interface, setting, by the card reader, the USB channel connection identification, going to Step S3; if the card reader connects to the upper computer through the Bluetooth module, setting the Bluetooth channel connection identification, then going to Step S3;

if the type is another interrupt identification, performing corresponding operation upon the type of the set interrupt identification, then going back to Step S2 comprise:

if the set interrupt identification is the USB insert interrupt identification, determining whether the sleep identification is set, if yes, resetting the sleep identification, waking up the MCU, enabling the USB channel, setting the USB channel connection identification, disabling the Bluetooth connection interrupt, determining whether the Bluetooth channel connection identification is set, if yes, resetting the Bluetooth channel connection identification, resetting the USB insert interrupt identification, going back to Step S2; if the Bluetooth channel connection identification is not set, resetting the USB insert interrupt identification, then going back to Step S2;

if the sleep identification is not set, determining whether the Bluetooth channel connection identification is set, if yes, resetting the Bluetooth channel connection identification, disabling the Bluetooth connection interrupt, enabling the USB channel, setting the USB channel connection identification, resetting the USB insert interrupt identification, going back to Step S2; if no, disabling the Bluetooth connection interrupt, enabling the USB channel, setting the USB channel connection identification, resetting the USB insert interrupt identification, then going back to Step S2;

if the set interrupt identification is USB pull-out interrupt identification, disabling the USB channel, resetting the USB channel connection identification, enabling the Bluetooth connection interrupt, resetting the USB pull-out interrupt identification, setting the sleep identification, then sleeping by the MCU;

if the set interrupt identification is the Bluetooth connection interrupt identification, determining whether the sleep identification is set, if yes, resetting the sleep identification, waking up the MCU, enabling the Bluetooth channel, setting the Bluetooth channel connection identification, resetting the Bluetooth connection interrupt identification, going back to Step S2; if no, enabling the Bluetooth channel, setting the Bluetooth channel connection identification, resetting the Bluetooth connection interrupt identification, then going back to Step S2;

if the set interrupt identification is the Bluetooth disconnection interrupt identification, disabling the Bluetooth channel, resetting the Bluetooth channel connection identification, resetting the Bluetooth disconnection interrupt identification, setting the sleep identification, then sleeping by the MCU.

17. The method of claim 14, wherein between Step S2' and Step S3, or between Step S2" and Step S3, the method comprises Step S3":

Step S3", detecting the connection way between the card reader and the upper computer;

if the card reader connects to the upper computer through the Bluetooth channel, setting, by the card reader, the Bluetooth channel connection identification, going to Step S3; if the card reader connects to the upper computer through the USB interface, setting the USB channel connection identification, going to Step S3;

if the type is another interrupt identification, performing corresponding operation upon the type of the set interrupt identification, then going back to Step S2, comprises:

if the set interrupt identification is that the set USB insert interrupt identification, determining whether the sleep identification is set, if yes, resetting the sleep identification, waking up the MCU, enabling the USB channel, setting the USB channel connection identification, resetting the USB insert interrupt identification, going back to Step S2; if no, enabling the USB channel, setting the USB channel connection identification, resetting the USB insert interrupt identification, then going back to Step S2;

if the set interrupt identification is the USB pull-out interrupt identification, resetting the USB channel connection identification, setting the sleep identification, resetting the USB pull-out interrupt identification, then sleeping by the MCU;

if the set interrupt identification is the Bluetooth connection interrupt identification, determining whether the sleep identification is set, if yes, resetting the sleep identification, waking up the MCU, enabling the Bluetooth channel, setting the Bluetooth channel connection identification, disabling the USB insert interrupt, resetting the Bluetooth connection interrupt identification, going back to Step S2; if no, determining whether the USB channel connection identification is set, if yes, resetting the USB channel connection identification, enabling the Bluetooth channel connection identification, setting the Bluetooth channel connection identification, disabling the USB insert interrupt, resetting the Bluetooth connection interrupt identification, going back to S2; and if the USB channel connection identification is not set, enabling the Bluetooth channel, setting the Bluetooth channel connection identification, disabling the USB insert interrupt, resetting the Bluetooth connection interrupt identification, then going back to Step S2; and if the set interrupt identification is the Bluetooth disconnection interrupt identification, disabling the Bluetooth channel, resetting the Bluetooth channel connection identification, enabling the USB insert interrupt, resetting the Bluetooth disconnection interrupt identification, setting the sleep identification, then sleeping by the MCU.

18. The method of claim 14, wherein if the type is another interrupt identification, performing corresponding operation upon the type of the set interrupt identification, then going back to Step S2, comprises:

if the set interrupt identification is the USB insert interrupt identification, determining whether the sleep identification is set, if yes, resetting the sleep identification, waking up the MCU, enabling the USB channel, setting the USB channel connection identification, disabling the Bluetooth connection interrupt, resetting the USB insert interrupt identification, going back to Step S2; if no, enabling the USB channel, setting the USB channel connection identification, disabling the Bluetooth connection interrupt, resetting the USB insert interrupt identification, then going back to Step S2;

if the set interrupt identification is the USB pull-out interrupt identification, disabling the USB channel, resetting the USB channel connection identification, enabling the Bluetooth connection interrupt, resetting the USB pull-out interrupt identification, setting the sleep identification, then sleeping by the MCU;

if the set interrupt identification is the Bluetooth connection interrupt identification, determining whether the sleep identification is set, if yes, resetting the sleep identification, waking up the MCU, enabling the Bluetooth channel, setting the Bluetooth channel connection identification, disabling the USB insert interrupt, resetting the Bluetooth connection interrupt identification, going back to Step S2; otherwise, enabling the Bluetooth channel, setting the Bluetooth channel connection identification, disabling the USB insert interrupt, resetting the Bluetooth connection interrupt identification, then going back to Step S2;

if the set interrupt identification is the Bluetooth disconnection interrupt identification, disabling the Bluetooth channel, resetting the Bluetooth channel connection identification, enabling the USB insert interrupt, resetting the Bluetooth disconnection interrupt identification, setting the sleep identification, then sleeping by the MCU.

19. The method of claim 15, wherein if the type is another interrupt identification, performing corresponding operation upon the type of the set interrupt identification, then going back to Step S2, comprises:

if the set interrupt identification is the card insert interrupt identification, determining whether the sleep identification is set, if yes, resetting the sleep identification, waking up the MCU, setting the card slot state identification as with-card identification, determining whether the USB channel connection identification is set, if yes, writing a card insert response to the INT endpoint, resetting the card insert interrupt identification, going back to Step S2; if no, resetting the card insert interrupt identification, going back to Step S2; if the sleep identification is not set, determining whether the USB channel connection identification is set, if yes, writing the card insert interrupt response to the INT endpoint, resetting the card insert interrupt identification, going back to Step S2; if no, resetting the card insert interrupt identification, then going back to Step S2;

if the set interrupt identification is the card pull-out interrupt identification, setting the card slot state identification as without-card identification, determining whether the USB channel connection identification is set, if yes, writing a card pull-out response to the INT endpoint, resetting the card pull-out interrupt identification, setting the sleep identification, sleeping by the MCU; if no, resetting the card pull-out interrupt identification, setting the sleep identification, then sleeping by the MCU;

if the set interrupt identification is the timer interrupt identification, clearing a counter value, resetting the timer interrupt identification, setting the sleep identification, then sleeping by the MCU.

20. The method of claim 15, wherein, the Step S5 specifically comprises:
a, when an instruction is received through the USB channel, setting the USB channel identification; when the instruction is received through the Bluetooth channel, setting the Bluetooth channel identification;
b, performing corresponding operation upon the type of the instruction, sending a corresponding response to the upper computer, clearing the corresponding interrupt identification, comprises:
if the received instruction is a card slot state inquiring instruction, inquiring the card slot state, setting preset bytes of card slot state data, detecting the type of the current set channel identification; if the type is the Bluetooth channel identification, sending the card slot state data to the upper computer through the Bluetooth channel, resetting the Bluetooth channel identification, resetting the Bluetooth channel interrupt identification; if the type is the USB channel identification, sending the card slot state data to the upper computer through the USB channel, resetting the USB channel identification, resetting the USB communication interrupt identification;
if the received instruction is a power-up instruction, powering up the card slot, reading a power-up response, detecting the type of the current set channel identification, if the type is the Bluetooth channel identification, sending the power-up response to the upper computer through the Bluetooth channel, resetting the Bluetooth channel identification, and resetting the Bluetooth communication interrupt identification; if the type is the USB channel identification, sending the power-up response to the upper computer through the USB channel, resetting the USB channel identification, and resetting the USB communication interrupt identification;
if the received instruction is a power-off instruction, powering off the card slot, reading a power-off response, detecting the type of the current set channel identification, if the type is the Bluetooth channel identification, sending the power-off response to the upper computer through the Bluetooth channel, resetting the Bluetooth channel identification, and resetting the Bluetooth communication interrupt identification; if the type is the USB channel identification, sending the power-off response to the upper computer through the USB channel, resetting the USB channel identification, and resetting the USB communication interrupt identification;

if the received instruction is a card operating instruction, sending the card operating instruction to the card, receiving a card operation response returned from the card, detecting the type of the current set channel identification, if the type is the Bluetooth channel identification, sending the card operation response to the upper computer through the Bluetooth channel, resetting the Bluetooth channel identification, and resetting the Bluetooth channel interrupt identification; if the type is the USB channel identification, sending the card operation response to the upper computer through the USB channel, resetting the USB channel identification, and resetting the USB communication interrupt identification;

if the received instruction is a Bluetooth module parameter information inquiring instruction, determining whether the Bluetooth channel identification is set, if yes, sending the parameters of the Bluetooth module to the upper computer though the Bluetooth channel, waiting for receiving new parameters of the Bluetooth module issued by the upper computer, disconnecting the Bluetooth module, writing the new parameters, switching the Bluetooth module into connection state, resetting the Bluetooth channel identification, and resetting the Bluetooth communication interrupt identification; if no, reporting error.

21. The method of claim 20, wherein the Step S5 further comprises:
a', when the USB channel receives the instruction, setting the USB channel identification; when the Bluetooth channel receives the instruction, setting the Bluetooth channel identification;
b', performing corresponding operation upon the type of the instruction, sending the corresponding response to the upper computer, and clearing corresponding interrupt identification, comprises:
if the received instruction is a channel switching instruction, detecting whether the current set channel identification is the Bluetooth channel identification, if yes, disabling the Bluetooth channel, resetting the Bluetooth channel identification, enabling the USB channel, setting the USB channel identification, and resetting the USB communication interrupt identification; if no, disabling the USB channel, resetting the USB channel identification, enabling the Bluetooth channel, and resetting the Bluetooth channel identification.

22. The method of claim 14, wherein
the parameters of the Bluetooth module specifically comprises: content of MAC, PIN and name of the card reader device;
the determining whether the reading is successful, specifically comprises, determining, by the card reader, whether reading is successful upon the preset bytes in the parameters of the Bluetooth module, determining that the reading is successful if the value of the specified bytes in the parameters of the Bluetooth module equals the preset bytes; determining that the reading is not successful if the value of the specified bytes of the parameters of the Bluetooth module does not equal the preset bytes;

when the card reader connects to the upper computer through the USB interface, the card reader is charged through the USB interface.

23. The method of claim 19, wherein sleeping by the MCU specifically comprises:

increasing frequency dividing value, decreasing the frequency of bus clock, switching the level of kernel voltage of MCU into state of which the voltage category is 1, disabling peripherals of a first serial communication interface and a second serial communication interface, then sleeping by the MCU.

* * * * *